US005918015A

United States Patent [19]

Suzuki et al.

[11] Patent Number: 5,918,015

[45] Date of Patent: Jun. 29, 1999

[54] REMOTE EXECUTION SYSTEM WITH PROGRAM RECEIVER

[75] Inventors: Motohiro Suzuki; Yoshiaki Kiriha, both of Tokyo, Japan

[73] Assignee: NEC Corporation, Tokyo, Japan

[21] Appl. No.: 08/806,787

[22] Filed: Feb. 26, 1997

[30] Foreign Application Priority Data

Feb. 28, 1996 [JP] Japan .................................... 8-067111

[51] Int. Cl.[6] ...................................................... G06F 17/00

[52] U.S. Cl. ......................................................... 395/200.49

[58] Field of Search ......................... 395/200.32, 200.49, 395/684, 685, 710; 711/118

[56] References Cited

U.S. PATENT DOCUMENTS

| | | | |
|---|---|---|---|
| 5,615,400 | 3/1997 | Cowsar et al. | 395/685 |
| 5,778,228 | 7/1998 | Wei | 395/684 |
| 5,809,302 | 9/1998 | Wang et al. | 395/685 |

FOREIGN PATENT DOCUMENTS

| | | |
|---|---|---|
| 4-322359 | 11/1992 | Japan . |
| 4-350756 | 12/1992 | Japan . |
| 6-12347 | 1/1994 | Japan . |
| 7-182174 | 7/1995 | Japan . |

OTHER PUBLICATIONS

J.W. Stamos et al., "Remote Evaluation", ACM Transactions on Programming Languages and Systems, vol. 12, No. 4, Oct. 1990, pp. 537–565.

D. Comer et al., "Network Structuring for bit Supplement TCP/IP vol. I", 2nd Edition, Kyoritsu Shuppan, K.K., Dec. 5, 1991, pp. 335–349.

"UNIX Network Programming", Chapter 14, Jul., 1992.

G. Goldszmidt et al., "Network Management by Delegation The MAD Approach", *IBM Research Report,* RC 17256 (#76343), Oct. 4, 1991.

*Primary Examiner*—Ellis B. Ramirez
*Attorney, Agent, or Firm*—Sughrue, Mion, Zinn, Macpeak & Seas, PLLC

[57] ABSTRACT

A remote execution system having a program receiver (server system) capable of receiving a program describing a flow of a complicated processing having a control structure such as branches and repeats from a client system C1, C2 or C3 and performing a remote execution of the program on its own. In the server, the program receiver receives a program sent from a client system C1, C2 or C3 and transfers the received program to a dynamic binding processing section including a link authority inspector and a specific operational object linker. After receiving the client system names from the program receiver, the link authority inspector inspects whether or not the client system C1, C2 or C3 has link authority. When the client system C1, C2 or C3 has the link authority, the specific operational object linker dynamically links specific operational objects to process operation names written in the program. A program execution section executes the linked program, and the program receiver transmits the program execution result to the client systems C1, C2 and C3. A program execution information storage stores the programs, access control information, and the specific operational objects. An agent system having a delegation device in a network management, to which the server system is applied is also disclosed.

13 Claims, 26 Drawing Sheets

| ACCESSIBLE CLIENT SYSTEM NAMES |
|---|
| ClientA |
| ClientB |
| ClientC |
| ⋮ |

| 141 ABSTRACT OPERATIONAL OBJECT NAMES | 142 SPECIFIC OPERATIONAL OBJECT NAMES |
|---|---|
| file_read | read fp |
| file_write | write fp |
| ⋮ | ⋮ |

F I G. 24
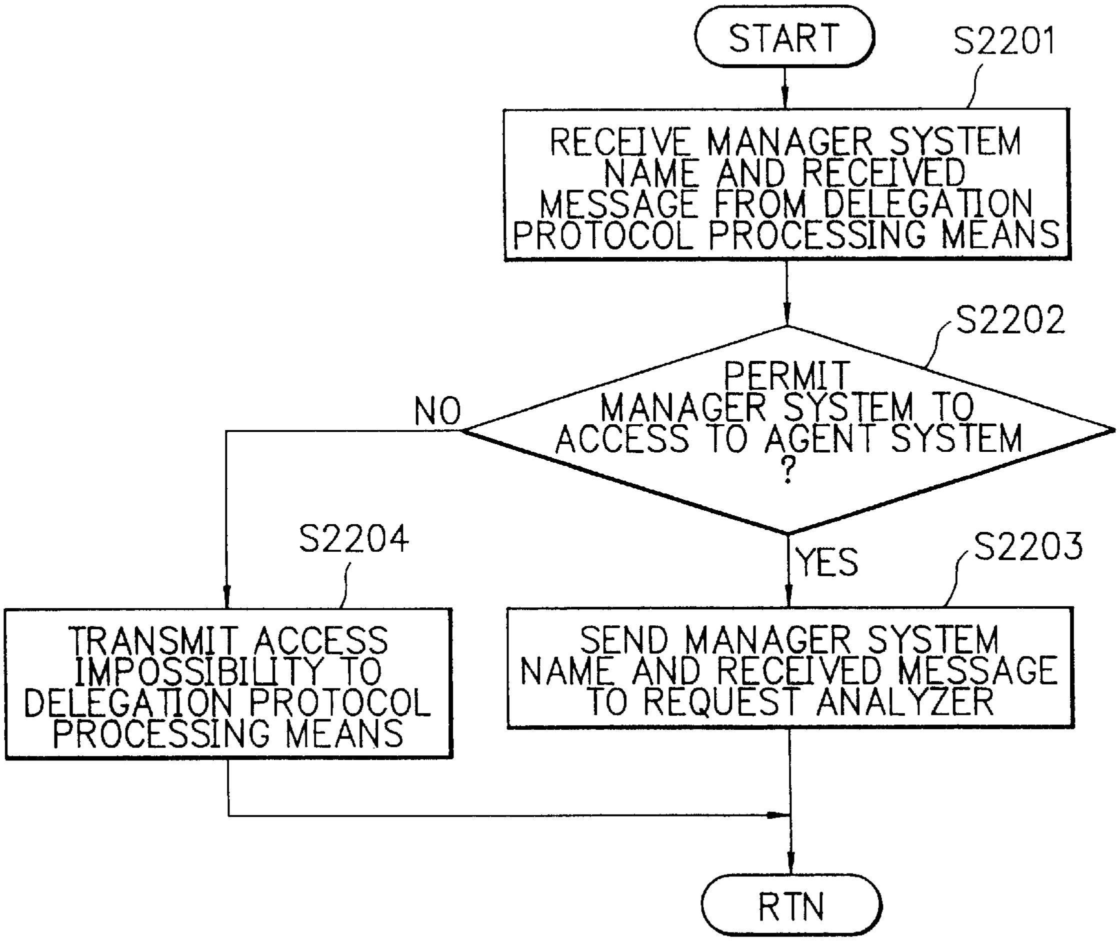

F I G. 26
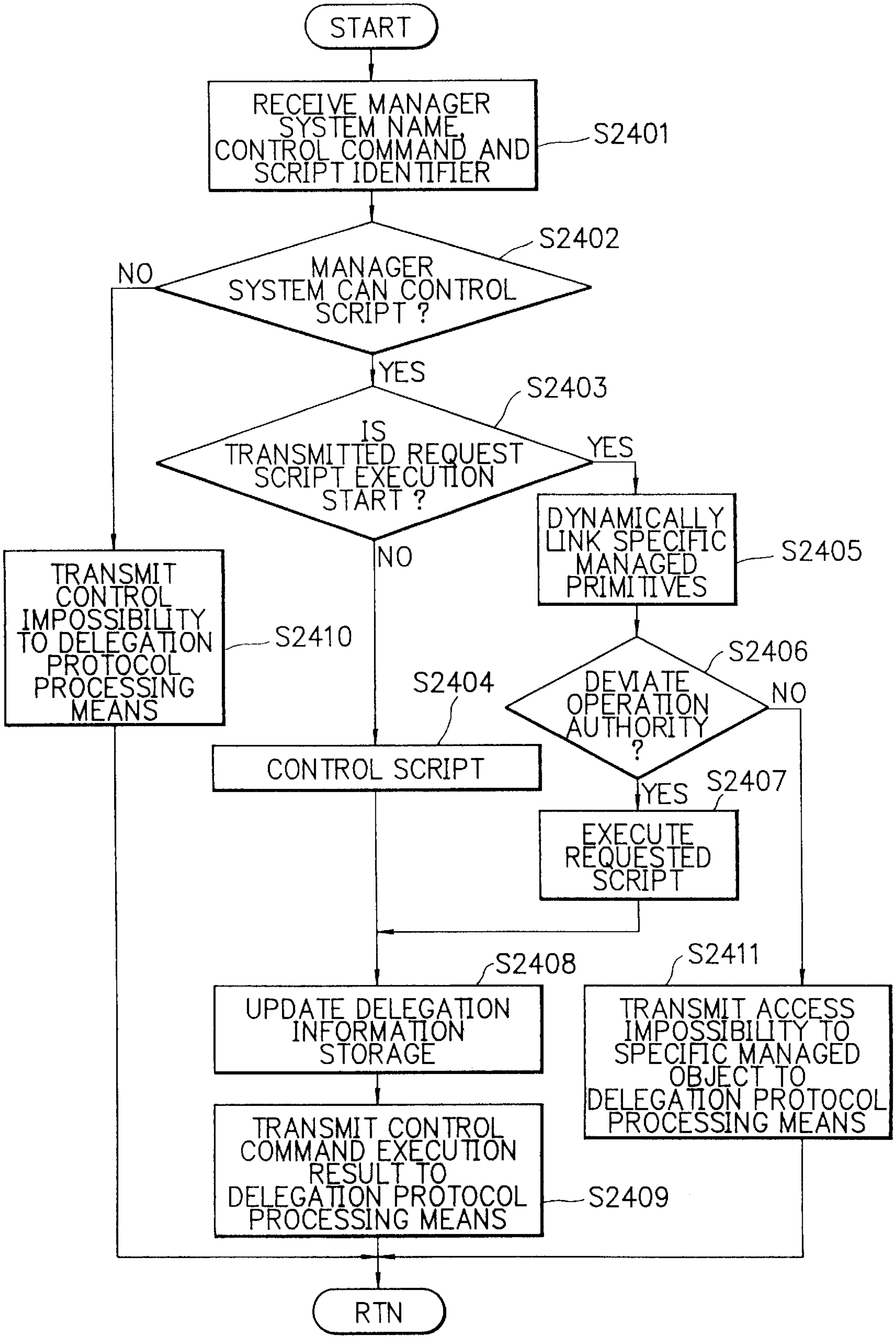

| ACCESSIBLE MANAGER SYSTEM NAMES |
|---|
| ManagerA |
| ManagerB |
| managerC |
| ⋮ |

| | | NANAGER SYSTEM NAMES | | |
|---|---|---|---|---|
| | | ManagerA | ManagerB | ManagerC |
| SPECIFIC MANAGER OBJECT NAMES | moA | read-write | read-write | not-access |
| | moB | read-only | read-write | read-only |
| | moC | not-access | read-write | not-access |
| | ⋮ | ⋮ | ⋮ | ⋮ |

| ABSTRACT MANAGED OBJECT NAMES (301) | SPECIFIC MANAGED OBJECT NAMES (302) |
|---|---|
| netA.ne1 | moA |
| netA.ne2 | moB |
| netA.ne3 | moC |
| ⋮ | ⋮ |

FIG. 33

| ABSTRACT MANAGED PRIMITIVE NAMES (311) | SPECIFIC MANAGED PRIMITIVE NAMES (312) |
|---|---|
| getValue | M-Get |
| setValue | M-Set |
| createMO | M-Create |
| deleteMO | M-Delete |
| ⋮ | ⋮ |

FIG. 36

| ABSTRACT MANAGED PRIMITIVE NAMES (341) | MANAGED PRIMITIVE NAMES (342) |
|---|---|
| getValue | M-Get |
| setValue | M-Set |
| createMO | M-Create |
| deleteMO | M-Delete |
| ⋮ | ⋮ |

REMOTE EXECUTION SYSTEM WITH PROGRAM RECEIVER

BACKGROUND OF THE INVENTION

The present invention relates to a remote execution system having a program receiver.

A conventional remote execution system having a program receiver (called "server system" hereinafter) is located at a remote place and is used for executing a requested processing, as appearing, for example, in "UNIX Network Programming", Chapter 14, July, 1992.

One example of a conventional remote execution system of this kind is shown in FIG. 1 wherein a server system 315 comprises an execution control section 352 and a command execution section 353.

The execution control section 352 can control UNIX commands during a remote execution, and the command execution section 353 can execute the UNIX commands transmitted from a client system C1 as a request transmission source. In FIG. 1, although only one client system C1 is shown, usually a plurality of client systems C1 to Ck (k=any positive integer) are connected to the server system 315.

FIG. 2 shows a conventional agent system having a delegation device (called "agent system" hereinafter) in a network management, to which the foregoing conventional remote execution system having a program receiver is applied, as disclosed in, for example, "Network Management by Delegation The MAD Approach", by German Goldszmidt et al., IBM Research Report, RC 17256 (#76343), April, 1991. This agent system is used in order to reduce the cost of communication between manager systems and agent systems and the load given to the manager systems in a centralized network management which has been performed conventionally.

In FIG. 2, the conventional agent system 3601 comprises an agent kernel 3602, delegated management process instances (called "DMPIs" hereinafter) D1 and D2 for implementing scripts of management tasks to be executed by the agent system 3601 (delegated management programs (called "DMPs" hereinafter)). and managed object resource controllers C01, C02 and C03 connected to managed object resources 01, 02 and 03. In this case, although two DMPIs D1 and D2, three managed object resource controllers C01, C02 and C03 and three managed object resources 01, 02 and 03 are shown in FIG. 2, in fact, a plurality of DMPIs D1 to Dk, a plurality of managed object resource controllers C01 to C0m (m=any positive integer) and a plurality of managed object resources 01 to 0m are present.

The DMPIs D1 and D2 carry out the management tasks described in the DMPs. The managed object resource controllers C0, C02 and C03 provide means to access to the actual managed object resources 01, 02 and 03. The agent kernel provides a delegation system and includes a delegation protocol processing means 3603, a delegation information storage 3604, a DMP converter 3605, a control means 3606, a DMPI controller 3607, a schedule controller 3608, a name determiner 3609 and an interprocess communicator 3610.

The delegation protocol processing means 3603 receives the DMPs and DMPI control commands sent from manager systems M1, M2 and M3, allow the delegation information storage 3604 to store the DMPs, and transmits the execution results of the DMPIs D1 and D2 and the control commands to the manager systems M1, M2 and M3. Although the three manager systems M1, M2 and M3 are shown in FIG. 2, in fact, a plurality of manager systems M1 to Mm can be used. The DMPs output from the manager systems M1, M2 and M3 include source codes written in the C or $C^{++}$ language and object codes obtained by their compilation.

The DMPI controller 3607 performs the input DMP as a light weight process, controls the DMPIs D1 and D2, and transmits the operation results of the DMPIs D1 and D2 to the delegation protocol processing means 3603. The DMPI controller 3607 can execute control commands such as a suspend, a stop and a resume for the DMPIs D1 and D2.

The control means 3606 produces all the components 3603 to 3610 of the agent kernel 3602 to initialize the agent system 3601 when the agent system is loaded into memory, initiates the DMPs to be executed from the initiation time of the agent system 3601 as the DMPIs D1 and D2, carries out the postprocessing such as a release of the memory when terminating the agent system 3601, and manages the agent system 3601 itself such as the processing method requested by the manager systems M1, M2 and M3.

The DMP converter 3605 converts the DMPs transmitted from the manager systems M1, M2 and M3 into their executable codes. That is, the input DMPs written in C or $C^{++}$ are converted into the executable object codes using a compiler or a linker in the DMP converter 3605.

In the aforementioned prior arts, the first problem is that it is difficult to execute a series of processing having a complicated control configuration including branches and repeats. This is because the prior arts aim to execute UNIX commands in the server system in the same manner as those given on a shell as an interface between a user and a UNIX operating system in a client system.

The second problem is that the user must understand the mountings and the practical usage of the server system in advance. The reason is as follows. That is, when the command is executed in the server system, as shown in FIG. 1, the command execution section 353 produces a new UNIX process and this process becomes the shell to run the requested command. At this time, the command name transmitted from the client system C1 is transferred to the shell as it is. Hence, when such a command is not present on a command retrieval path, no command execution can be performed.

Moreover, when the foregoing conventional remote execution system having a program receiver is applied to an agent system in a network management, the following third to eighth problems to be solved arise.

The third problem is that a management information storage (called "MIS" hereinafter) is not considered in the agent system 3601 shown in FIG. 1. This reason is that an open systems interconnection (called "OSI" hereinafter) is not considered at all.

The fourth problem is that the agent system 3601 is not provided with a common management operating means for the managed object resources 01, 02 and 03. This is because the managed object resource controllers C01, C02 and C03 provide the means to allow the DMPIs D1 and D2 to access to the actual managed object resources 01, 02 and 03, and correspond to the managed object resources 01, 02 and 03, respectively.

When there are a plurality of managed object resources 01 to 0m, a plurality of managed object resource controllers C01 to C0m are arranged so as to access to the respective managed object resources 01 to 0m directly using respective management operating manners.

The fifth problem is that, when the DMPs are described in the agent system 3601, this makes a load heavy for a supervisor to describe. The reason is that the DMPIs D1 and D2 access to the necessary managed object resource controllers C01, C02 and C03 directly, and in the case of the access to a plurality of managed object resources 01, 02 and 03, the description is required to change depending on the respective management operating manners of the managed object resources 01, 02 and 03.

The sixth problem is that the communication amount between the manager systems M1, M2 and M3 and the agent system 3601 becomes enormous. The reason is as follows. That is, since the DMPs are written in C or $C^{++}$, in order to convert the DMPs into the executable forms, the DMPs are to be compiled or linked. However, when the executable codes obtained by compiling or linking the DMPs in the manager systems M1, M2 and M3 are transmitted to the agent system 3601, in the case that the manager systems M1, M2 and M3 are different from the agent system 3601 in their architecture, the agent system cannot execute the commands. Hence, the manager systems M1, M2 and M3 must transmit the source codes written in C or $C^{++}$ to the agent system 3601.

The seventh problem is that the agent system 3601 cannot flexibly deal with the managing lines of the management sites. The reason is as follows. That is, the DMPs transmitted from the manager systems M1, M2 and M3 are executed soon after compiling or linking in the agent system 3601. There are only two DMPI information such as "the initiated time of the DMPIs" and "the present states of the DMPIs", and there is no command for the supervisor to obtain this information.

The eighth problem is that the agent system 3601 cannot judge whether or not to access depending on the manager systems M1, M2 and M3. This is because an access control system permits the managed object resource controllers C01, C02 and C03 to access only to the attributes of the managed object resources 01, 02 and 03 opened by the managed object resource controllers C01, C02 and C03 in the agent system 3601.

SUMMARY OF THE INVENTION

It is therefore an object of the present invention to provide a remote execution system having a program receiver (server system) in view of the aforementioned problems of the prior art, which is capable of carrying out a remote execution of a complication processing having control connfiguration such as branches and repeats on the server system, allowing a user to describe only a flow of a processing without considering a construction and mountings of the server system to improve easy program writing, improving security of the server system, and reducing communication amount between the server system and a client system.

It is another object of the present invention to provide an agent system having a delegation device (agent system) in view of the aforementioned problems of the prior art, which is capable of improving a script skeleton description efficiency, meeting text form programs and executable programs written in binary codes or intermediate codes, reducing communication amount between the agent system and manager systems, carrying out an accurate script control to flexibly deal with a script execution and management side managing policies depending on load state of the agent system, and performing a flexible access control of the manager systems to the agent system to improve security of the agent system.

In accordance with one aspect of the present invention, there is provided a remote execution system having a program receiver, comprising a program receiver for receiving a program describing a flow of a processing transmitted from a client system as a request transmission source and transmitting an execution result of the program; a dynamic binding section including a specific operational object linker for dynamically linking specific operational objects of processing operations mounted on the remote execution system as a server system for executing a requested processing to processing operation names described in the program received by the program receiver, and a link authority inspector for inspecting whether or not a client system has link authority when linking the specific operational objects to the program; a program execution section for executing the program linked by the dynamic binding section; and a program execution information storage for storing the program, information required for an access control carried out by the dynamic binding section, and the specific operational objects.

In a remote execution system having a program receiver, preferably, a dynamic binding system dynamically links the specific operational objects corresponding to mountings of the server system to the processing operation name described in the program, and inspects whether or not the client system has the link authority of the specific operational objects when linking, to protect the server system.

A remote execution system having a program receiver can further comprises an access controller for inspecting whether or not the client system can access to the server system, resulting in enabling the access control depending on the claient system name with security improvement of the server system.

In a remote execution system having a program receiver, an access control system comprises an access controller for inspecting whether or not to permit the client system to access to the server system when the program is transmitted from the client system in order to prevent an execution of an incorrect program deviating the authority given to the client system; and a link authority inspector for inspecting whether or not link authority of the specific operational objects to be dynamically linked to the program when executing the program deviates the link authority previously given to the client system.

A remote execution system having a program receiver can further comprises a program converter for converting abstract operational object names as common processing operation names for all server systems into specific operational object names and converting programs of a changeable text form into programs of an executable form for the server systems by compiling or the like. As a result, the user can describe the program independent of the mountings of each server system, and easy program writing can be improved.

In a remote execution system having a program receiver, the program converter can include means for dealing with not only the programs of the text form but also programs written in either binary codes or intermediate codes.

Preferably, a remote execution system having a program receiver further comprises an access controller for inspecting whether or not a client system is accessible to the server system; and a program converter for converting abstract operational object names as common processing operation names for all server systems into specific operational object names and converting programs of a changeable text form into programs of an executable form for the server systems by compiling or the like.

A remote execution system having a program receiver can further comprises an access controller for inspecting whether or not a client system is accessible to the server system; and a program converter for converting abstract operational object names as common processing operation names for all server systems into specific operational object names, converting programs of a changeable text form into programs of an executable form for the server systems by compiling or the like, and dealing with not only the programs of the text form but also programs written in either binary codes or intermediate codes.

In accordance with another aspect of the present invention, there is provided an agent system in a network management, to which a remote execution system having a program receiver of any of clams 1 to 8 is applied, comprising a delegation protocol processing means for communicating messages with manager systems; an access control means for determining whether or not to permit the manager systems to access to the agent system in response to an access request of the manager systems; a request analyzing means for analyzing the message transmitted from the manager systems; a script converting means for converting a script skeleton which describes only a flow of a management operation in an abstract expression independent of mountings of the agent system and a management operation realized in the agent system and corresponds to a program into a script representing a series of management operation corresponding to the agent system and a realizing method of the management operation; a script control means for controlling a start of a new script and a running script; a delegation information storage for storing the scripts, information of the scripts, information required for the access control, and information required for the script conversion; a managed object resource controllers for controlling managed object resources; a management information storage for storing management objects obtained by abstracting the managed object resources; an agent core which manages the management information storage, provides operations to the management information storage and common management operations to various managed object resources, converts the requested management operations into forms corresponding to the managed object resource controllers, and delivers the converted forms to appropriate managed object resource controllers; and a management protocol processing section for converting operation requests at the management protocol into forms corresponding to the agent system.

In an agent system, an access control system can comprises an access controller for determining whether or not to permit the manager systems to access to the agent system when the messages are transmitted from the manager systems in order to protect the managed object resources and the agent system; a script controller which determines whether or not the manager system can execute a script control when controlling the script and inspects whether or not operation authority of specific managed primitives to be dynamically linked to a new script when executing the new script deviates the operation authority previously given to the manager system; and a script converter for determining whether or not the manager system deviates the operation authority to the specific managed objects when abstract managed primitive and object names in the transmitted script skeleton are converted into specific managed primitive and object names.

In an agent system, preferably, a script control system further includes a script create and transmission, a script delete, a script execution start and a script information acquisition in addition to a suspended, a stop, and a resume which are provided in a conventional agent system.

In an agent system, a script information structure further includes "script identifier" to be uniform within the agent system, "manager system name" having transmitted a script, and "comment" carrying out a simple description of the script in addition to "start date" and "state" which are conventional.

In an agent system, when a running script accesses to a management information storage and managed object resources, the running script indirectly accesses to an agent core by communicating with a management protocol processing section, resulting in improving flexibility of the delegation execution section.

BRIEF DESCRIPTION OF THE DRAWINGS

The objects, features and advantages of the present invention will become more apparent from the consideration of the following detailed description, taken in conjunction with the accompanying drawings, in which:

FIG. 24 is a flow chart showing a processing of an access controller shown in FIG. 22;

FIG. 26 is a flow chart showing a processing of a script controller shown in FIG. 22;

FIG. 30 is a schematic diagram showing one example of a manager system name list to be stored in a delegation information storage shown in FIG. 22;

FIG. 31 is a schematic diagram showing one example of a management operation authority list to be stored in the delegation information storage shown in FIG. 22;

FIG. 32 is a schematic diagram showing one example of a specific managed object corresponding list to be stored in the delegation information storage shown in FIG. 22;

FIG. 33 is a schematic diagram showing one example of a specific managed primitive corresponding list to be stored in the delegation information storage shown in FIG. 22;

FIG. 36 is a schematic diagram showing one example of a managed primitive corresponding list to be stored in a delegation information storage of the delegation execution section shown in FIG. 34.

DESCRIPTION OF THE PREFERRED EMBODIMENTS

Figure 1:
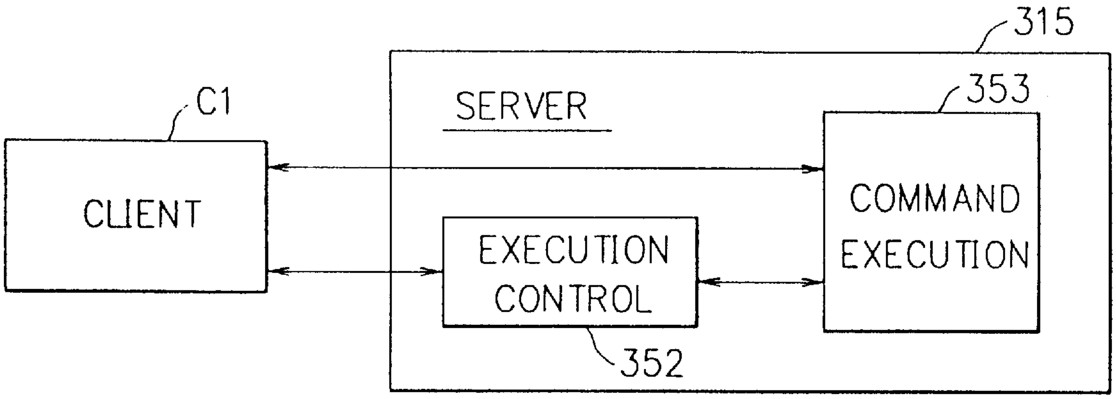
FIG. 1 is a block diagram of a conventional remote execution system having a program receiver.
Figure 2:
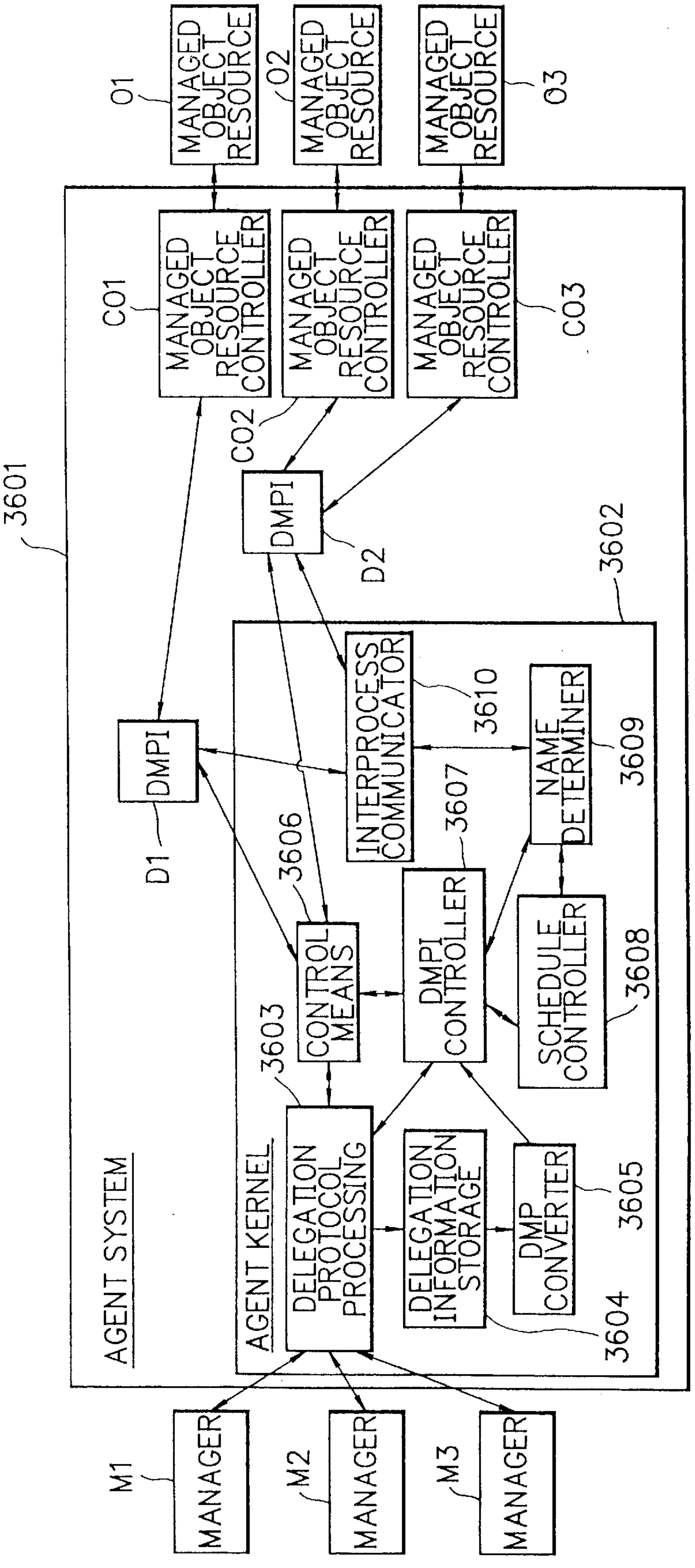
FIG. 2 is a block diagram of a conventional agent system having a delegation device.
Figure 3:
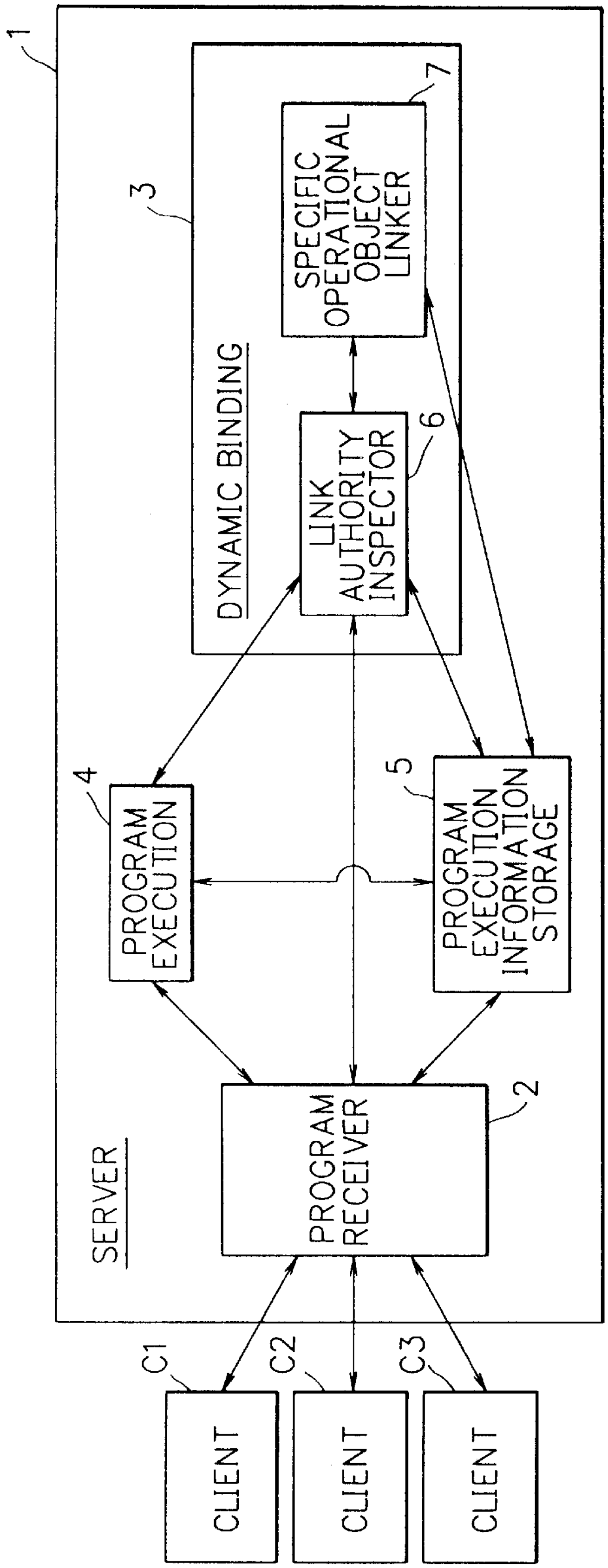
FIG. 3 is a block diagram of a remote execution system having a program receiver (server system) according to a first embodiment of the present invention.

Referring now to the drawings, wherein like reference characters designate like or corresponding parts throughout the several views and thus the repeated description thereof can be omitted for brevity, there is shown in FIG. 3 a remote execution system having a program receiver (called "server system" hereinafter) according to a first embodiment of the present invention.

In FIG. 3, the server system 1 comprises a program receiver 2, a dynamic binding section 3, a program execution section 4 and a program execution information storage 5.

The program receiver 2 receives programs transmitted from client systems C1, C2 and C3 and transmits the execution results of the programs. The programs are written in binary codes so as to be executable by the server system 1 immediately, or in intermediate codes independent of architectures of servers. Although only three client systems C1, C2 and C3 are shown in FIG. 3, in fact, a plurality of client systems C1 to Ck may be connected to the server system 1. The program execution section 4 implements the programs.

Figure 7:
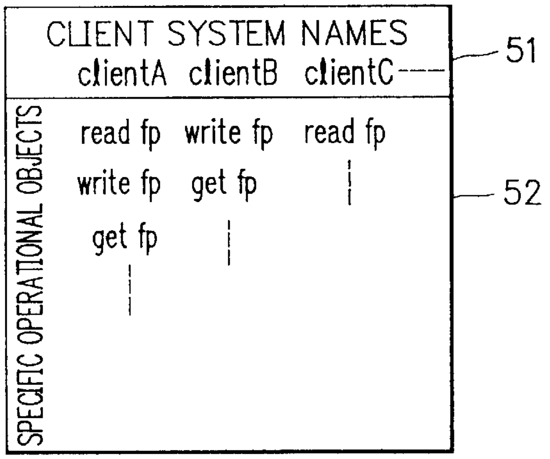
FIG. 7 is a schematic diagram showing one example of names of linkable specific operationalal objects authorized to link to client systems, to be stored in a program execution information storage shown in FIG. 3.

The program execution information storage 5 stores programs, link control information and specific operational objects. The link control information includes a table of specific operational objects linkable to the client systems C1, C2 and C3 at the executing time (called "link authority table" hereinafter). One example of the link authority table is shown in FIG. 7 in which a client system name field 51 contains names ("clientA", "clientB", "clientC", . . . ) of client systems accessible to the server system 1, and a specific operational object name field 52 contains names ("readfp", "writefp", "getfp", . . . ) of specific operational objects linkable to the client systems C1, C2 and C3 in the server system 1.

The dynamic binding section 3 includes a link authority inspector 6 and a specific operational object linker 7. The link authority inspector 6 inspects whether or not the client systems C1, C2 and C3 have the authority to link the specific operational objects corresponding to the process operation names in the programs transmitted from the client systems C1, C2 and C3. The specific operational object linker 7 links the specific operational objects corresponding to the process operation names in the programs.

Figure 4:
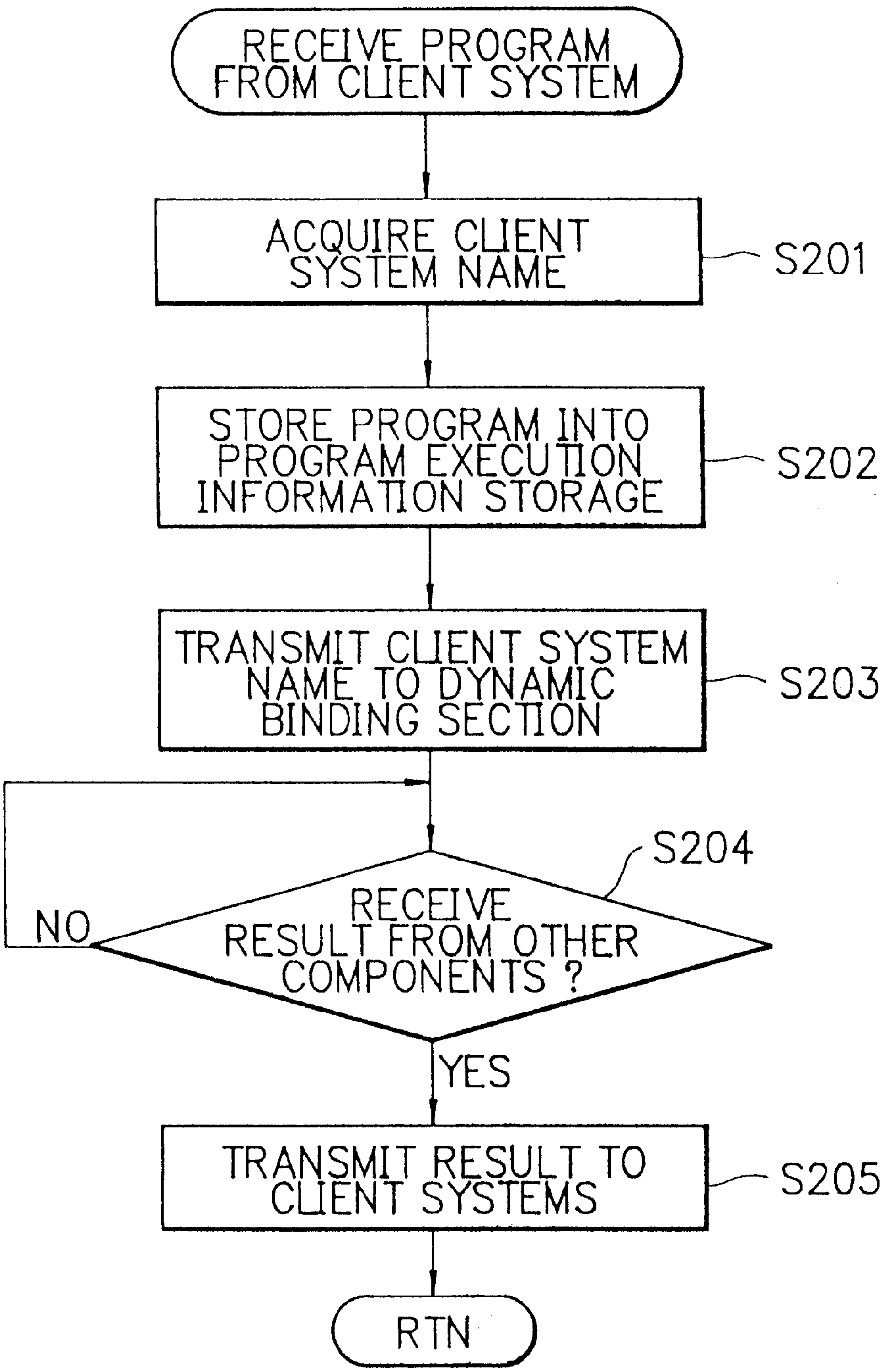
FIG. 4 is a flow chart showing a processing of a program receiver shown in FIG. 3.
Figure 5:
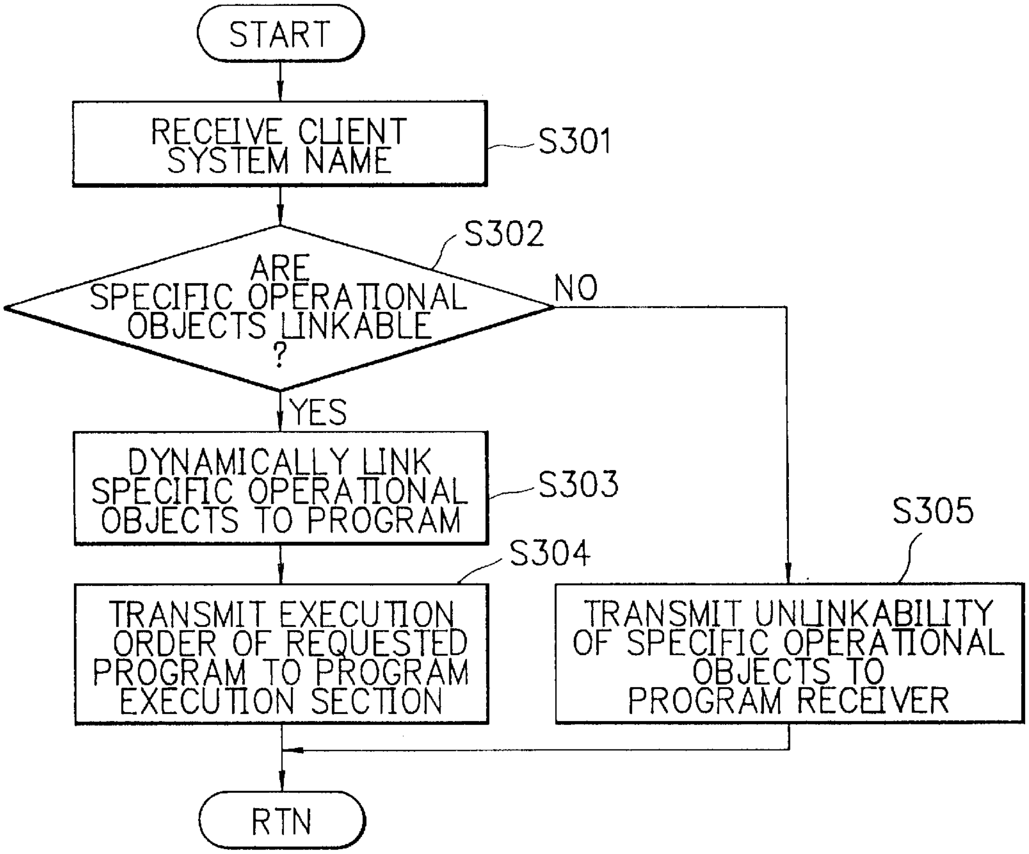
FIG. 5 is a flow chart showing a processing of a dynamic binding section shown in FIG. 3.
Figure 6:
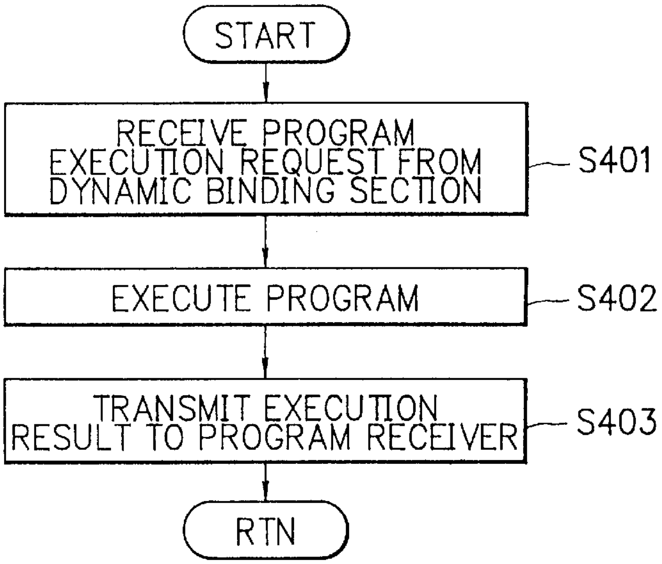
FIG. 6 is a flow chart showing a processing of a program execution section shown in FIG. 3

FIG. 4 to FIG. 6 illustrate the processings of the program receiver 2, the dynamic binding section 3 and the program execution section 4.

Referring to FIG. 4, the processing of the program receiver 2 includes a client system name acquisition step S201, a program store step S202, a client system name transmission step S203, a result receive discrimination step S204, and a result transmission step S205.

In FIG. 5, the processing of the dynamic binding section 3 includes a client system name receive step S301, a specific operational object linkability discrimination step S302, a specific operational object dynamic link step S303, a program execution order transmission step S304, and a specific operational object unlinkability transmission step S305.

As shown in FIG. 6, the processing of the program execution section 4 includes a program execution request receive step S401, a program execution step S402, and an execution result transmission step S403.

Next, the operation of the above-described server system according to the first embodiment of the present invention will be described in connection with FIG. 3 to FIG. 6.

Now, assuming that the program receiver 2 receives a program from the client system C1, the program receiver 2 starts the processing shown in FIG. 4. First, the program receiver 2 acquires the names of the client systems of which connections with the program receiver 2 have been established in step S201. The program receiver 2 then stores the program received from the client system C1 into the program execution information storage 5 in step S202. The program receiver 2 transmits the acquired names of the client systems to the dynamic binding section 3 in step S203. Thereafter, the program receiver 2 awaits the processing results of the other components in step S204.

The dynamic binding section 3 then starts the processing shown in FIG. 5. In the dynamic binding section 3, first, the link authority inspector 6 receives the client system names from the program receiver 2 in step S301. The link authority inspector 6 then inspects whether or not the client system C1 has the authority to link the specific operational objects using the link authority table (see FIG. 7) stored in the program execution information storage 5 in step S302. That is, the link authority inspector 6 acquires all the linkable specific operational object names from the link authority table using the client system names as the key and inspects whether or not the requested specific operational object names are present in all the linkable specific operational object names.

As a result of step S302, when the client system C1 has no authority to link, the dynamic binding section 3 judges that the specific operational objects cannot be linked, and transmits this result to the program receiver 2 in step S305. When receiving this result from the link authority inspector 6, the program receiver 2 transmits an unlinkable message of the specific operational objects to the client system C1 in step S205.

On the other hand, in the dynamic binding section 3, as a result of step S302, when the client system C1 can link all the specific operational objects, the specific operational object linker 7 dynamically links the specific operational objects corresponding to the process operation names within the program in step S303. Thereafter, the link authority inspector 6 transmits a program execution order to the program execution section 4 in step S304.

The program execution section 4 then starts the processing shown in FIG. 6. First, the program execution section 4 receives the program execution order from the dynamic binding section 3 in step S401, and executes the program stored in the program execution information storage 5 in step S402. The program execution section 4 then transmits the program execution result to the program receiver 2 in step S403. When receiving the program execution result from the program execution section 4, the program receiver 2 transmits the program execution result to the client system C1 in step S205.

Figure 8:
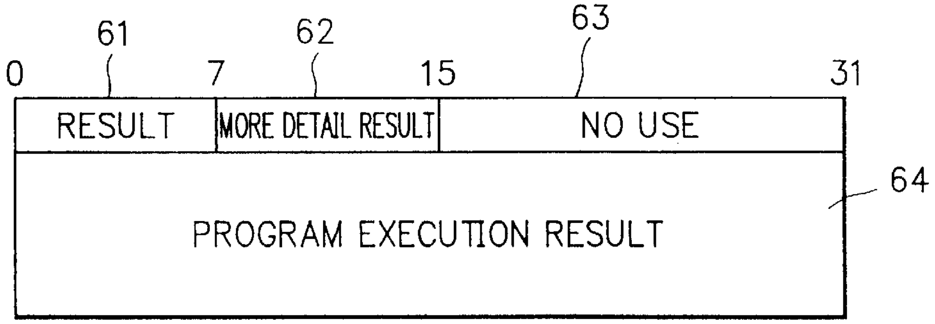
FIG. 8 is a schematic diagram showing a format of a message to be transmitted from a server system to client systems in the present invention.

FIG. 8 shows a format of a message to be transmitted from the server system 1 to the client systems C1, C2 and C3. In FIG. 8, a result field 61 contains a program execution result, i.e., either "0 (success)" or "1 (failure)". A more detail result field 62 contains more detailed information such as either "1 (unlinkability of specific operational objects)" or "2 (the other errors)" when the result field 61 contains "1 (failure)". When the result field 61 contains "0 (success)", the more detail result field 62 contains "0". A program execution result field 64 contains the execution result of the program.

Figure 9:
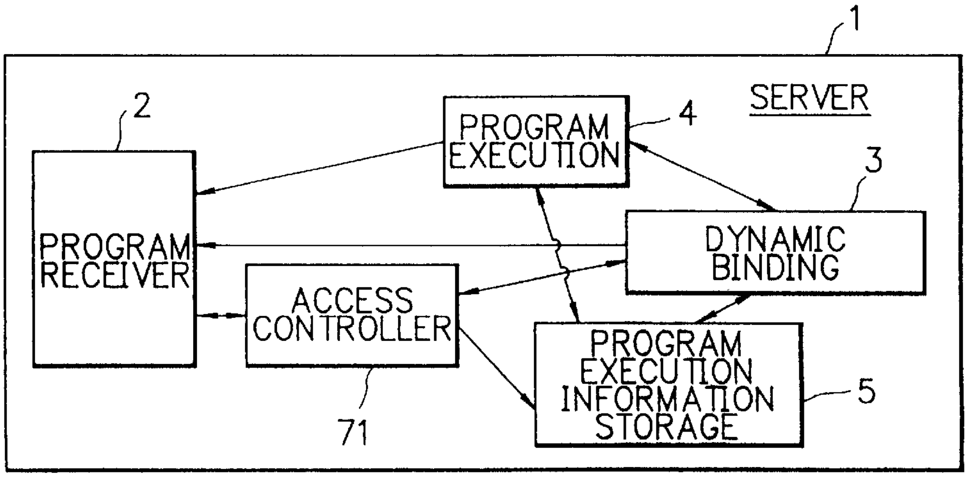
FIG. 9 is a block diagram of a remote execution system having a program receiver (server system) according to a second embodiment of the present invention.

A server system according to a second embodiment of the present invention, as shown in FIG. 9, will now be described in detail.

In FIG. 9, the server system 1 has a similar construction to that of the first embodiment shown in FIG. 3. except that the server system 1 further includes an access controller 71. The access controller 71 inspects whether or not the client systems are accessible to the server system 1. In addition, the program execution information storage 5 supplementarily includes a list of names of client systems which are accessible to the server system and are used for the access controller 71 (called "client system name list" hereinafter). One example of the client system name list is shown in FIG. 12 in which an access permissible client system name field 101 contains access permissible client system names ("clientA", "clientB", "clientC", . . . ) to the server system.

Figure 10:
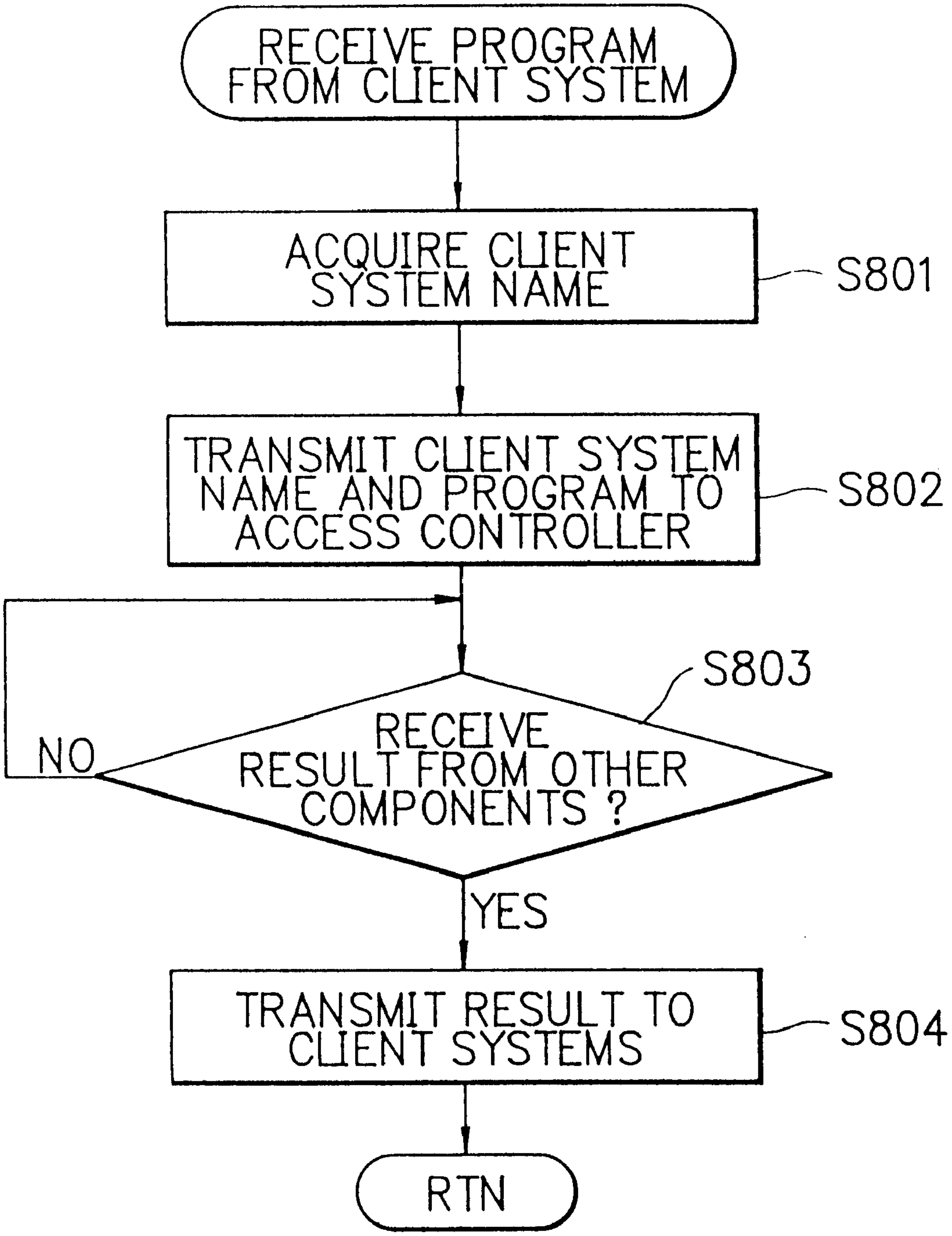
FIG. 10 is a flow chart showing a processing of a program receiver shown in FIG. 9.

FIG. 10 shows a processing of the program receiver 2, including a client system name acquisition step S801, a client system name and program transmission step S802, a result receive discrimination step S803 and a result transmission step S804.

Figures 11, 12:
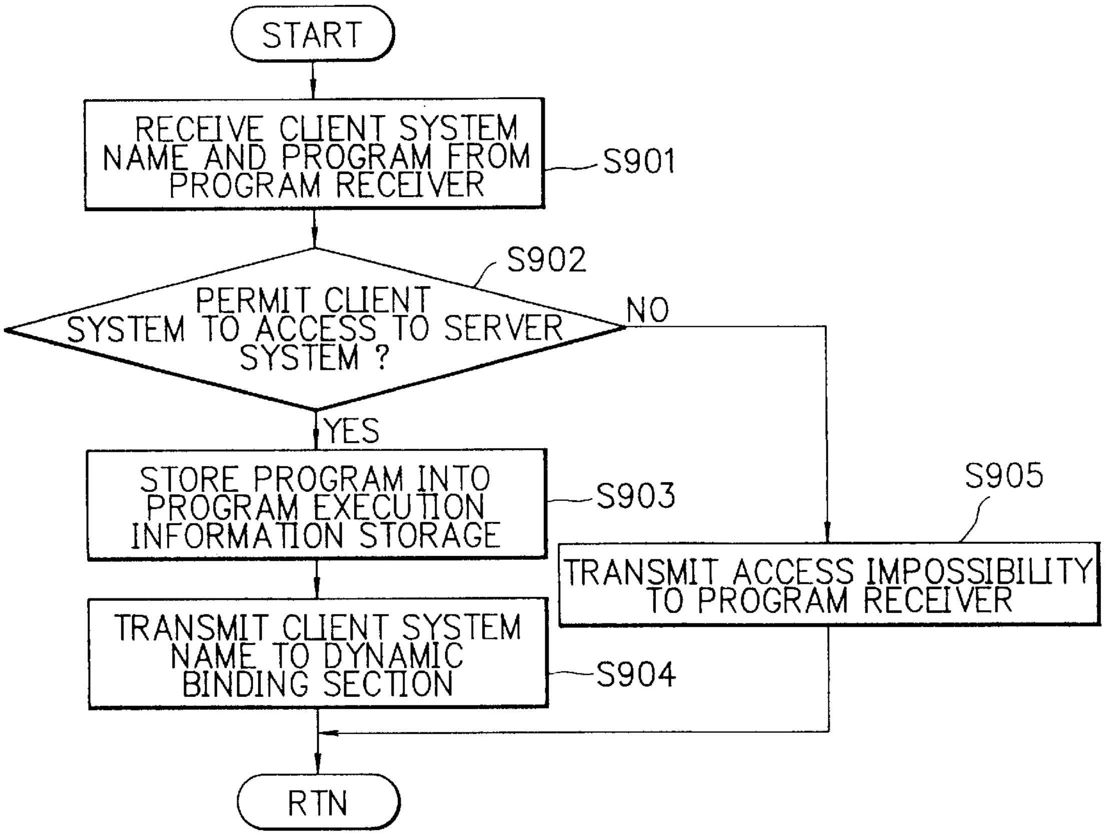
FIG. 11 is a flow chart showing a processing of an access controller shown in FIG. 9.
FIG. 12 is a schematic diagram showing one example of a list of names of client systems to be stored in a program execution information storage shown in FIG. 9.

FIG. 11 shows a processing of the access controller 71, including a client system name and program receive step S901, an access permission discrimination step S902, a program storage step S903, a client system name transmission step S904 and an access impossibility transmission step S905.

Next, the operation of the above-described server system according to the second embodiment of the present invention will be described in connection with FIG. 9 to FIG. 12.

Now, assuming that the program receiver 2 receives a program from the client system C1, the program receiver 2 starts the processing shown in FIG. 10. First, the program receiver 2 acquires the names of the client systems of which connections with the program receiver 2 have been established in step S801. The program receiver 2 then transmits the acquired names of the client systems and the program to the access controller 71 in step S802. Thereafter, the program receiver 2 awaits the processing results of the other components in step S803.

The access controller 71 then starts the processing shown in FIG. 11. First, the access controller 71 receives the client system names and the program from the program receiver 2 in step S901. The access controller 71 then determines whether or not to permit the client system C1 to access to the server system 1 in step S902. That is, the access controller 71 searches the client system name list (see FIG. 12) stored in the program execution information storage 5 using the client system names transmitted from the program receiver 2 as the key to retrieve the name of the client system C1.

As a result of step S902, when the client system name is retrieved, the access controller 71 judges the access permission to the server system 1 and sends the program to the program execution information storage 5 for storing the program in step S903. Thereafter, the access controller 71 transmits the client system name to the dynamic binding section 3 in step S904.

On the other hand, as a result of step S902, when the client system name is not retrieved, the access controller 71 transmits the access impossibility to the server system 1 to the program receiver 2 in step S905. When receiving the access impossibility from the access controller 71, the program receiver 2 transmits the access impossible message to the server system 1 to the client system C1 in step S804.

Thereafter, the dynamic binding section 3 and the program execution section 4 are successively operated in the same manner as those of the first embodiment described above with reference to FIGS. 7 and 8, and thus the description thereof can be omitted for brevity.

Further, in this embodiment, a message format to be transmitted from the server system 1 to the client systems C1, C2 and C3 is the same as the message format, as shown in FIG. 8, of the first embodiment, except that the more detail result field 62 contains any one of "1 (access impossibility to server system)", "2 (unlinkability of specific operational objects)", and "3 (the other errors)".

In the server system of the second embodiment, besides the link authority control of the dynamic binding section 3, in the server system of the first embodiment, the access controller 71 for controlling the access of the client systems C1, C2 and C3 to the server system is supplemented, and hence the access control depending on the client systems. C1, C2 and C3 can be effectively carried out. As a result, security can be improved in the server system.

Figure 13:
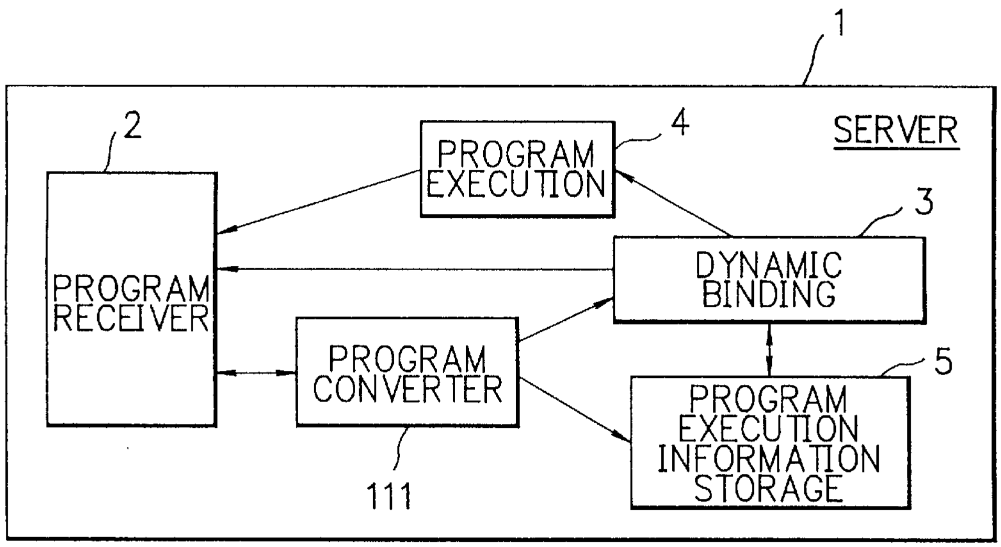
FIG. 13 is a block diagram of a remote execution system having a program receiver (server system) according to a third embodiment of the present invention.

A server system according to a third embodiment of the present invention, as shown in FIG. 13, will now be described in detail.

In FIG. 13, the server system 1 has a similar construction to that of the first embodiment shown in FIG. 3, except that the server system I further includes a program converter 111. The program converter 111 converts abstract operational object names into specific operational object names, and simultaneously converts not only programs written in binary codes or intermediate codes used in the server system of the first embodiment, but also programs of a changeable text type into executable forms for the server system 1 by, for example, compiling.

In addition, the program execution information storage 5 supplementarily includes a corresponding list between abstract and specific operational object names (called "specific operational object corresponding list" hereinafter). One example of the specific operational object corresponding list is shown in FIG. 16 in which an abstract operational object name field 141 contains abstract operational object names ("file_read", "file_write", . . . ) and a specific operational object name field 142 contains specific operational object names ("readfp", "writefp", . . . ) corresponding to the above respective abstract object names.

Figure 14:
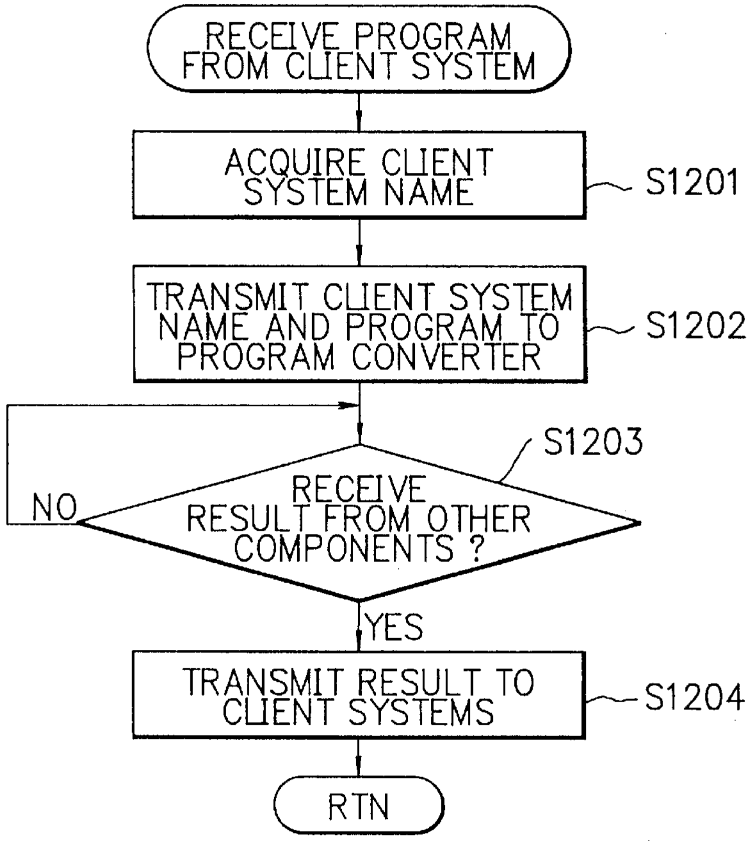
FIG. 14 is a flow chart showing a processing of a program receiver shown in FIG. 13.

FIG. 14 shows the processing of the program receiver 2, including a client system name acquisition step S1201, a client system name and program transmission step S1202, a result receive discrimination step S1203 and a result transmission step S1204.

Figures 15, 16:
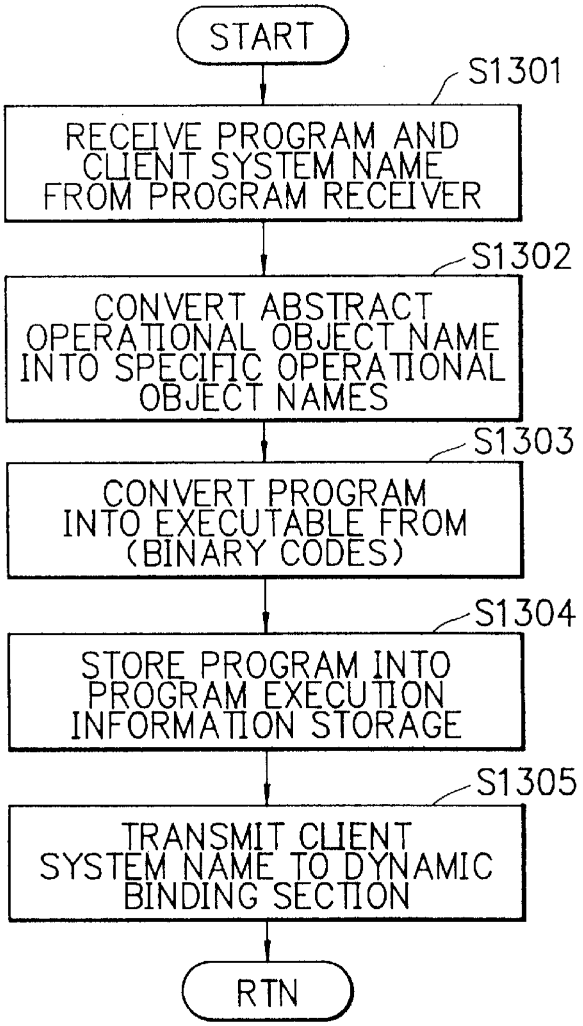
FIG. 15 is a flow chart showing a processing of a program converter shown in FIG. 13.
FIG. 16 is a schematic diagram showing one example of a specific operational object corresponding list to be stored in a program execution information storage shown in FIG. 13.

FIG. 15 shows the processing of the program converter 111, including a program and client system name receive step S1301, an abstract-specific operational object name conversion step S1302, a program executable form conversion step S1303, a program storage step S1304, and a client system name transmission step S1305.

Next, the operation of the above-described server system according to the third embodiment of the present invention will be described in connection with FIG. 13 to FIG. 16.

Now, assuming that the program receiver 2 receives a program from the client system C1, the program receiver 2 starts the processing shown in FIG. 14. First, the program receiver 2 acquires the names of the client systems of which connections with the program receiver 2 have been established in step S1201. The program receiver 2 then transmits the acquired names of the client systems and the program to the program converter 111 in step S1202. Thereafter, the program receiver 2 awaits the processing results of the other components in step S1203.

The program converter 111 then starts the processing shown in FIG. 15. First, the program converter 111 receives the client system names and the program from the program receiver 2 in step S1301. The program converter 111 converts the abstract operational object names into the specific operational object names in step S1302. This is conducted by using the specific operational object corresponding list (see FIG. 16) stored in the program execution information storage 5 to convert the abstract operational object names into the specific operational object names. The program converter 111 then converts the program into the executable form such as binary codes or intermediate codes for the server system 1 by, for example, compiling or the like in step S1303. Next, the program converter 111 sends the program of binary codes or intermediate codes to the program execution information storage 5 for storing the program in step S1304. Thereafter, the program converter 111 transmits the client system name to the dynamic binding section 3 so as to execute the script in step S1305.

Thereafter, the dynamic binding section 3 and the program execution section 4 are successively operated in the same manner as those of the first embodiment described above with reference to FIGS. 7 and 8, and thus the description thereof can be omitted for brevity.

Further, in this embodiment, a format of a message to be transmitted from the server system 1 to the client systems C1, C2 and C3 is the same as the message format, as shown in FIG. 8, of the first embodiment.

In the server system of the third embodiment, not only the programs written in the binary codes or the intermediate codes for the server system of the first embodiment but also the programs written in the abstract form such as the text type independent of the construction of the server systems can be used, and the user can write the programs in the abstract expression independent of the server systems. As a result, easy program writing can be improved.

A server system according to a fourth embodiment of the present invention will now be described in detail.

In this embodiment, the server system 1 has the same construction as that of the third embodiment shown in FIG. 13. However, a program converter Ill can convert not only the text type programs used in the server system of the third embodiment but also the programs written in the binary codes or the intermediate codes used in the server system of the first embodiment.

Figure 17:
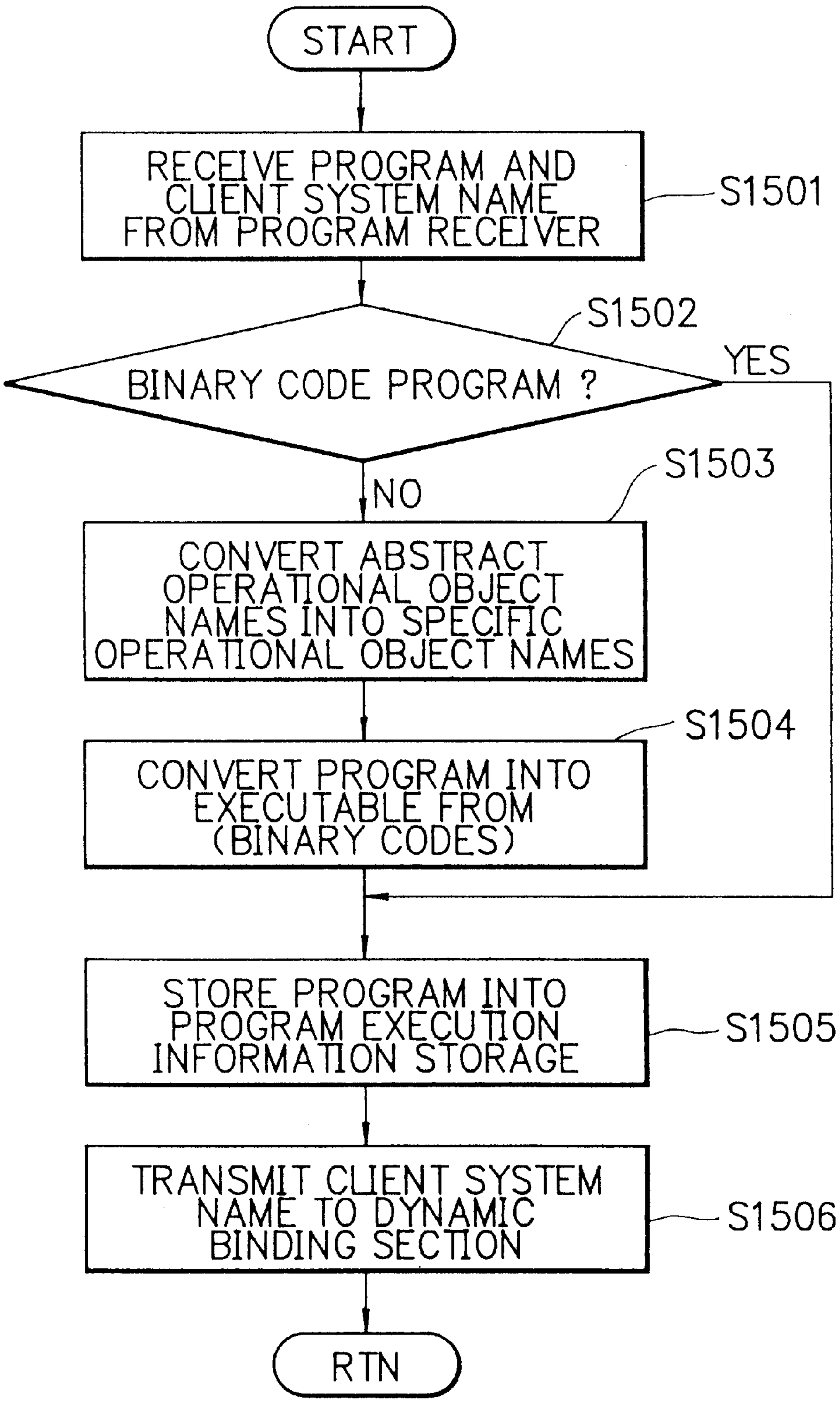
FIG. 17 is a flow chart showing a processing of a program receiver of a remote execution system having a program receiver (server system) according to a fourth embodiment of the present invention.

FIG. 17 illustrates the processing of the program converter 111, including a program and client system name receive step S1501, a program binary form discrimination step S1502, an abstract-specific operational object name conversion step S1503, a program executable form conversion step S1504, a program storage step S1505, and a client system name transmission step S1506.

Next, the operation of the above-described server system according to the fourth embodiment of the present invention will be described in connection with FIG. 17.

The difference of the operation of the fourth embodiment from the operation of the third embodiment is that the program converter 111 carries out the operation shown in FIG. 17, as described above. After the operation of the program receiver 2, the program converter 111 starts the processing shown in FIG. 17.

First, the program converter 111 receives the program and the client system names from the program receiver 2 in step S1501. The program converter 111 then checks whether or not the program is written in binary codes in step S1502. As a result of step S1502, when the program is written in the text form, the program converter 111 converts the abstract operation object name into the specific operation object name using the specific operation object corresponding list (see FIG. 16) stored in the program execution information storage 5 in step S1503. The program converter 111 then converts the program into the executable form such as binary codes or intermediate codes for the server system 1 by, for example, compiling or the like in step S1504. Next, the program converter 111 sends the program of the binary codes or intermediate codes to the program execution information storage 5 for storing the program in step S1505. Thereafter, the program converter 111 transmits the client system name to the dynamic binding section 3 so as to execute the script in step S1506.

In this embodiment, a message format to be transmitted from the server system 1 to the client systems C1, C2 and C3 is the same as the message format, as shown in FIG. 8, of the first embodiment.

In the server system of the fourth embodiment, besides the text form programs used in the third embodiment, the programs written in the binary codes and the intermediate codes can be used, and all the forms of programs can be adaptable. As a result, selection flexibility of the program forms prepared by the user can be improved.

Figure 18:
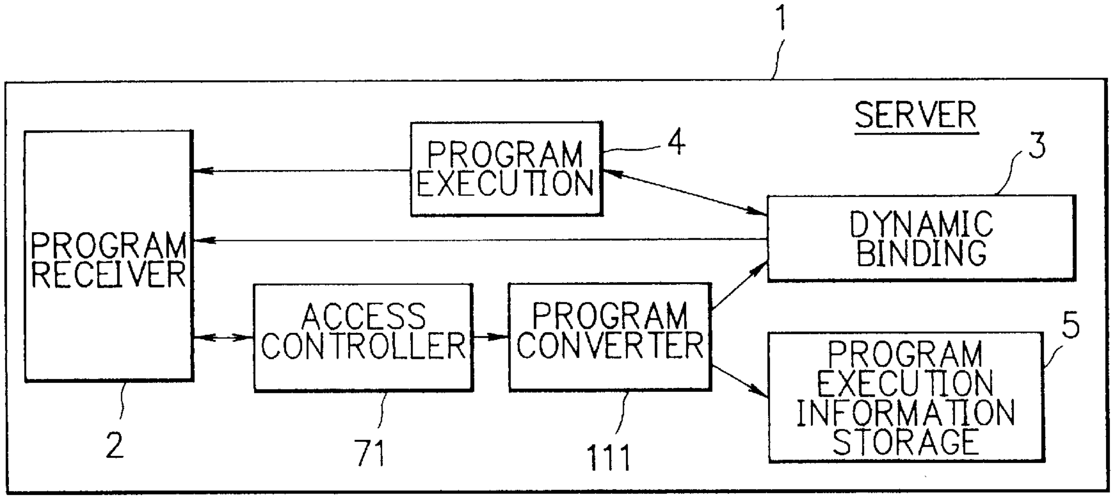
FIG. 18 is a block diagram of a remote execution system having a program receiver (server system) according to a fifth embodiment of the present invention.

A server system according to a fifth embodiment of the present invention, as shown in FIG. 18, will now be described in detail.

As shown in FIG. 18, the server system 1 has a construction composed of a combination of the server systems of the second and the third embodiments. That is, in this embodiment, the server system 1 further includes an access controller 71 and a program converter 111 in addition of all the components of the first embodiment.

Figure 19:
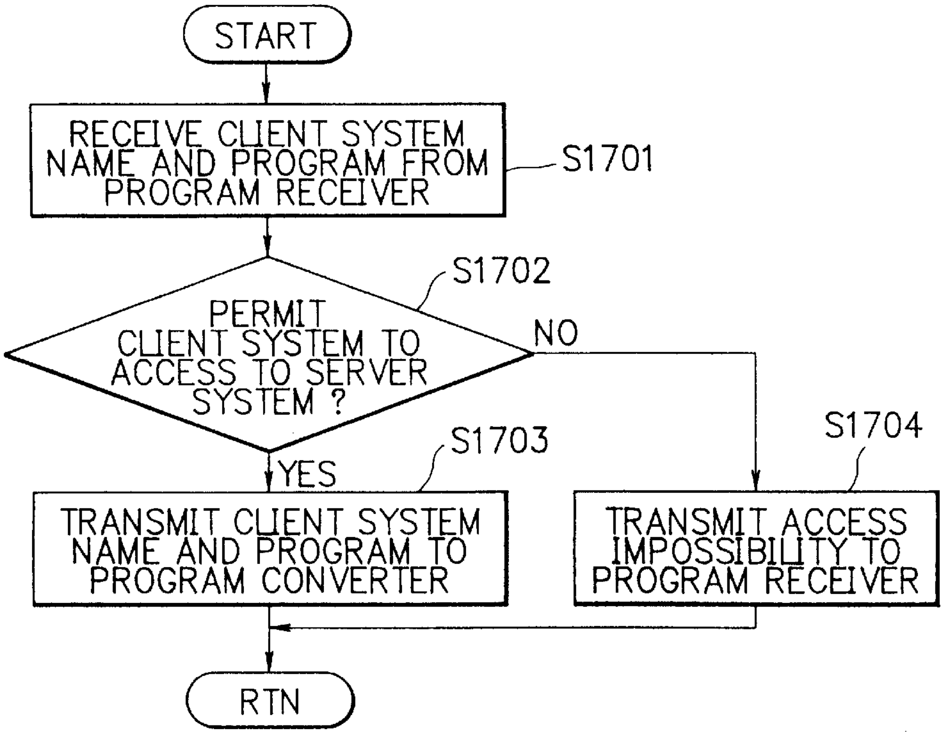
FIG. 19 is a flow chart showing a processing of an access controller shown in FIG. 18.

FIG. 19 shows the processing of the access controller 71, including a client system name and program receive step S1701, an access permission discrimination step S1702, a client system name and program transmission step S1703 and an access impossibility transmission step S1704.

Figure 20:
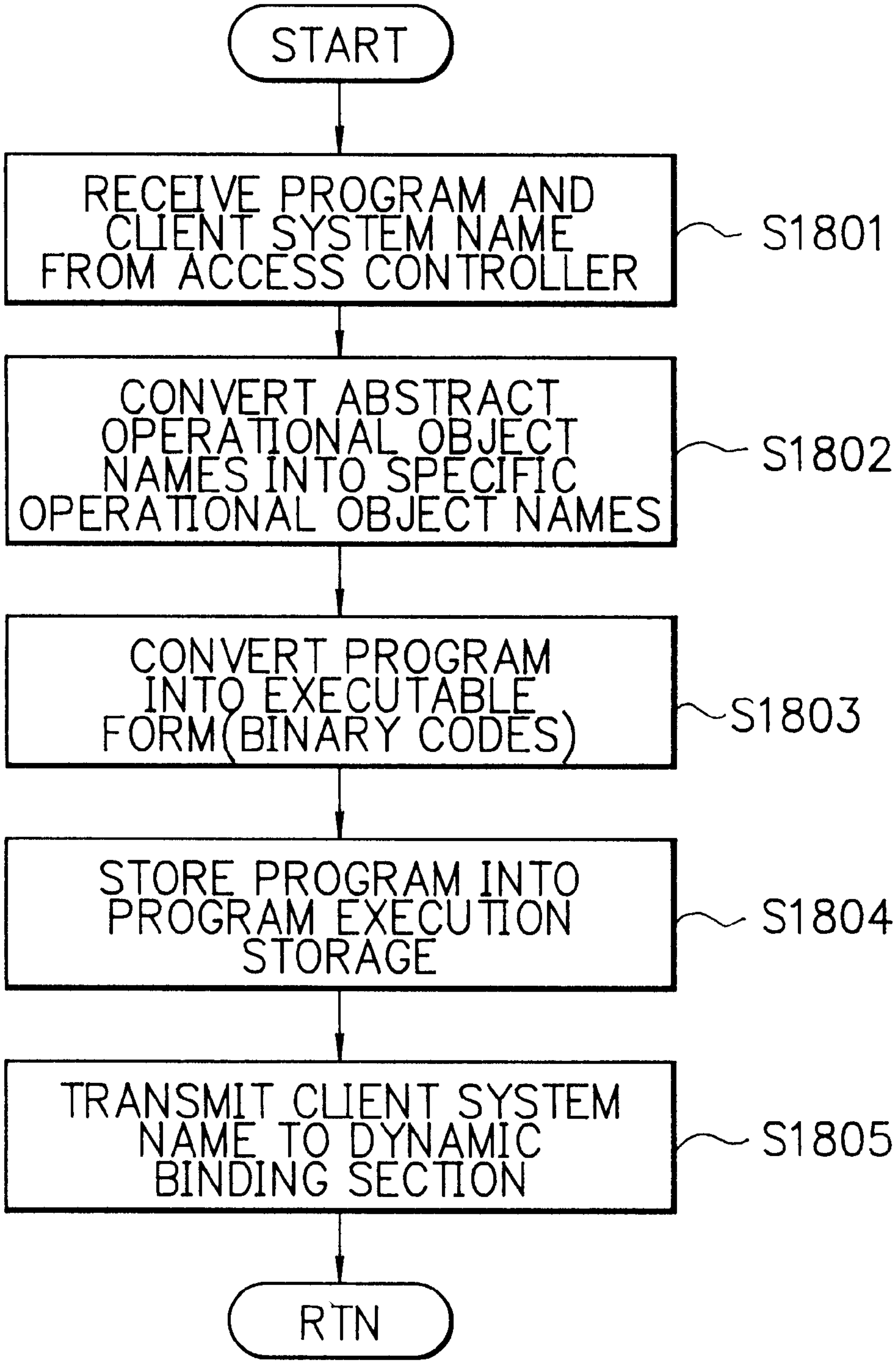
FIG. 20 is a flow chart showing a processing of a program converter shown in FIG. 18.

FIG. 20 shows the processing of the program converter 111, including a program and client system name receive step S1801, an abstract-specific operational object name conversion step S1802, a program executable form conversion step S1803, a program storage step S1804, and a client system name transmission step S1805.

Next, the operation of the above-described server system according to the fifth embodiment of the present invention will be described in connection with FIG. 18 to FIG. 20.

Now, assuming that the program receiver 2 receives a program from the client system C1, the program receiver 2 starts the processing shown in FIG. 10, which is almost the same as that of the second embodiment and the description thereof can be thus omitted for brevity. In this embodiment, the text form programs are processed.

The access controller 71 then starts the processing shown in FIG. 19. First, the access controller 71 receives the client system names and the program from the program receiver 2 in step S1701. The access controller 71 then determines whether or not to permit the client system C1 to access to the server system 1 in step S1702. The processing in step S1702 is the same as that in step S902 shown in FIG. 11.

In step S1702, when the client system name is retrieved, the access controller 71 judges the access permission to the server system 1 and transmits the client system name and the program to the program converter 111 in step S1703.

On the other hand, in step S1702, when the client system name is not retrieved, the access controller 71 transmits the access impossibility to the server system 1 to the program receiver 2 in step S1704. When receiving the access impossibility from the access controller 71, the program receiver 2 transmits the access impossibility message to the server system 1 to the client system C1 in step S804.

The program converter 111 then starts the processing shown in FIG. 20. The processing shown in FIG. 20 is the same as that shown in FIG. 15 in the second embodiment, except that the program converter 111 receives the program and the client system name from the access controller 71, and the further description thereof can be omitted for brevity.

Thereafter, the dynamic binding section 3 and the program execution section 4 are successively operated in the same manner as those of the first embodiment described above with reference to FIGS. 7 and 8, and thus the description thereof can be omitted for brevity.

In this embodiment, a message format to be transmitted from the server system 1 to the client systems C1, C2 and C3 is the same as the message format, as shown in FIG. 8, of the first embodiment.

In the server system of the fifth embodiment, the advantages of the server systems of the second and third embodiments can be obtained. That is, the addition of the access controller 71 brings about the improvement of security, and the addition of the program converter 111 for the user the program writing in the abstract expression independent of the server systems with the result of the improvement of easy program writing.

A server system according to a sixth embodiment of the present invention will now be described in detail.

In this embodiment, the server system 1 has the same construction as that of the fifth embodiment shown in FIG. 18. Although the program converter Ill deals with only the text form programs in the server system of the fifth embodiment, in this embodiment, the program converter 111 can process not only the text type programs but also the programs written in the binary codes and the intermediate codes, that is, all the form of programs.

Figure 21:
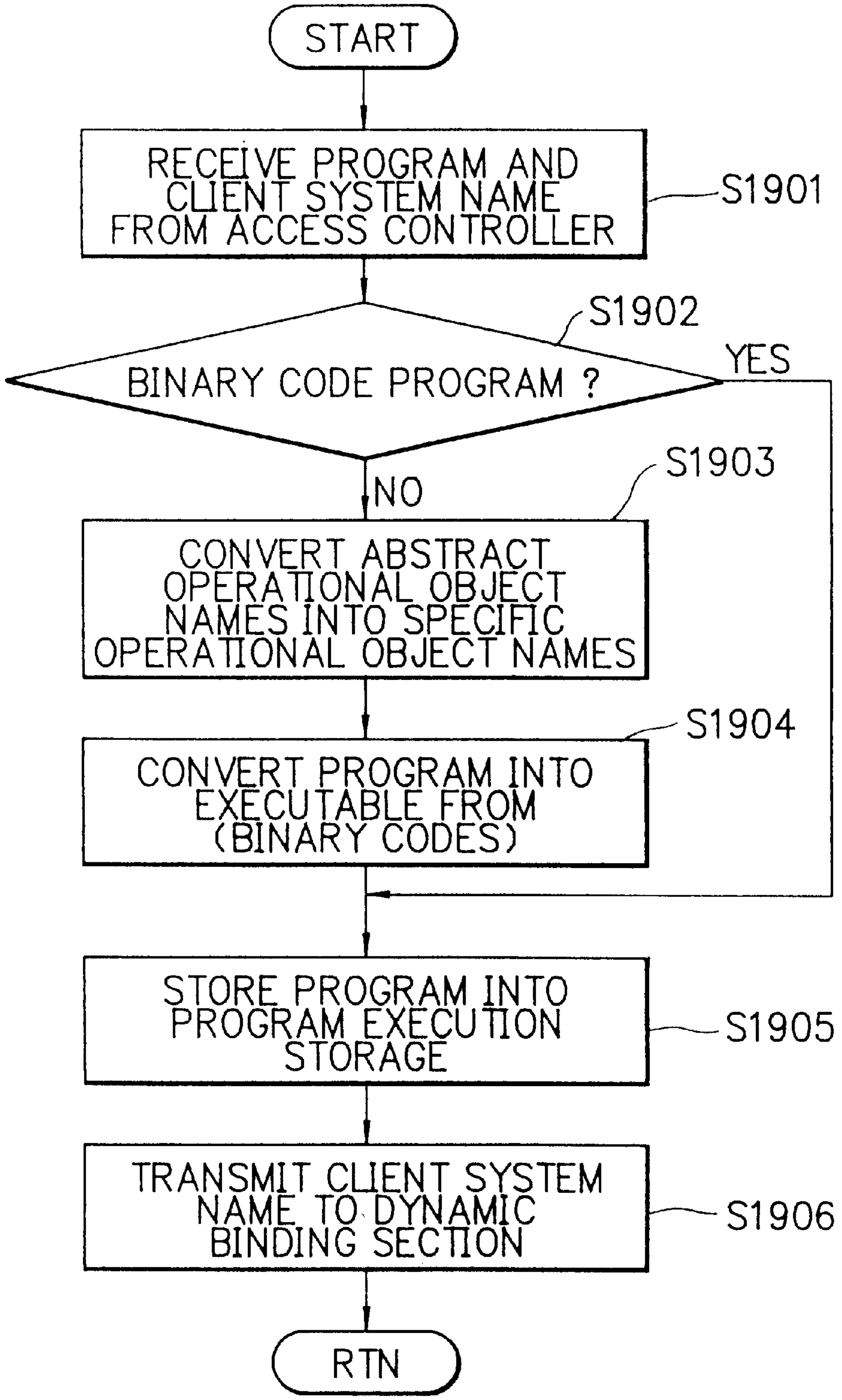
FIG. 21 is a flow chart showing a processing of a program receiver of a remote execution system having a program receiver (server system) according to a sixth embodiment of the present invention.

FIG. 21 illustrates the processing of the program converter 111, including a program and client system name receive step S1901, a program binary form discrimination step S1902, an abstract-specific operational object name conversion step S1903, a program executable form conversion step S1904, a program storage step S1905, and a client system name transmission step S1906.

Next, the operation of the above-described server system according to the sixth embodiment of the present invention will be described in connection with FIG. 21.

The difference of the operation of the sixth embodiment from the operation of the fifth embodiment is that the program converter ill carries out the operation shown in FIG. 21, as described above. Further, the processing shown in FIG. 21 is the same as that shown in FIG. 17 in the fourth embodiment, except that the program converter 111 receives the program and the client system name from the access controller 71, and the further description thereof can be omitted for brevity.

In this embodiment, a message format to be transmitted from the server system 1 to the client systems C1, C2 and C3 is the same as the message format, as shown in FIG. 8, of the first embodiment.

In the server system of the sixth embodiment, the advantages of the server systems of the fourth and fifth embodiments can be obtained. That is, the addition of the access controller 71 brings about the improvement of security. Further, the program converter 111 can process all the forms of programs such as the text form programs and the programs written in the binary codes and the intermediate codes, and selection flexibility of the program forms prepared by the user can be improved.

An agent system according to a seventh embodiment of the present invention will now be described in detail.

Figure 22:
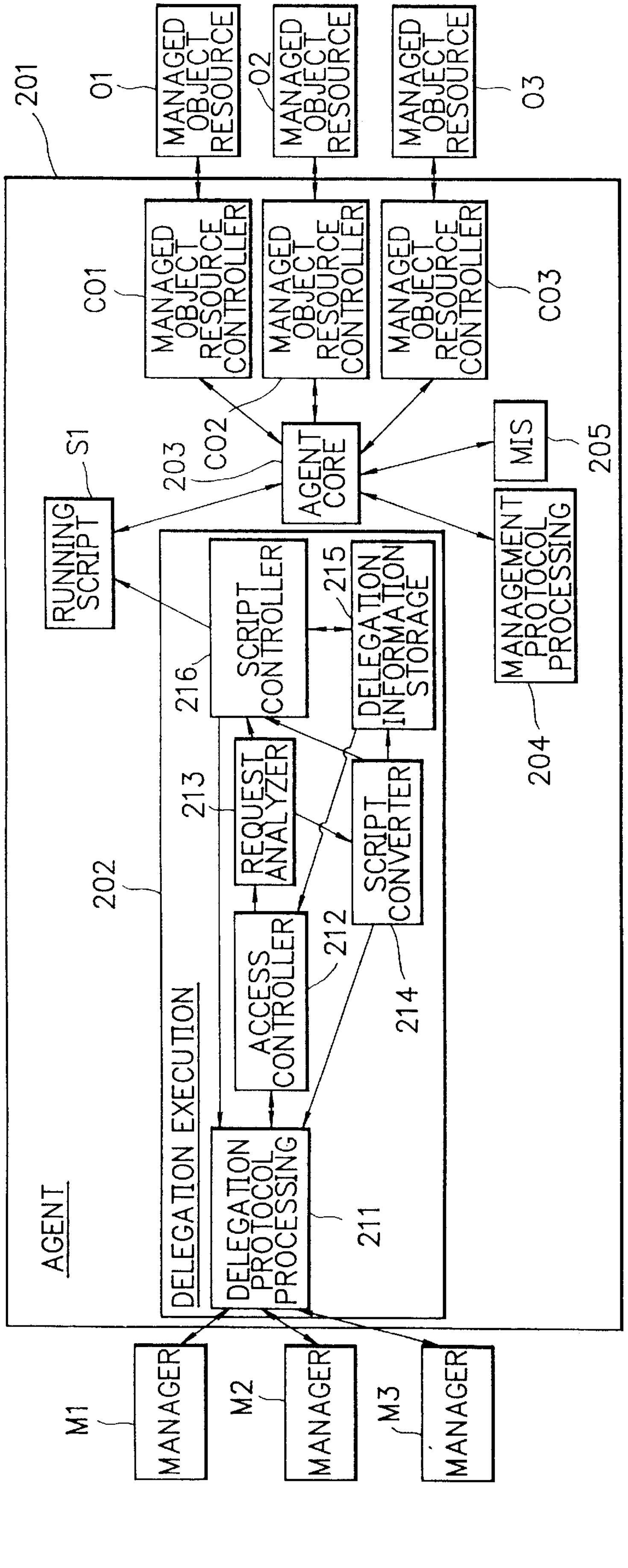
FIG. 22 is a block diagram of an agent system having a delegation device according to a seventh embodiment of the present invention, to which a remote execution system having a program receiver of the present invention is applied in a network management.

In FIG. 22, there is shown an agent system having a delegation device (called "agent system" hereinafter) in a network management, to which a remote execution system having a program receiver (server system) is applied, according to the seventh embodiment of the present invention.

As shown in FIG. 22, the agent system 201 comprises a delegation execution section 202, an agent core 203, a management protocol processing section 204, an MIS (management information storage) 205, a running script S1 (in course of execution), and managed object resource controllers C01, C02 and C03 coupled to managed object resources 01, 02 and 03, respectively. In FIG. 22, although one running script S1, three managed object resource controllers C01, C02 and C03 and three managed object resources 01, 02 and 03 are shown, in fact, a plurality of running scripts S1 to Sk, a plurality of managed object resource controllers C01 to C0m and a plurality of managed object resources 01 to 0m are used.

The agent core 203 manages the MIS 205, provides an operation to the MIS 205 and a common management operation to the various managed object resources 01, 02 and 03, and converts the requested management operation into an adaptive form to the managed object resource controllers C01, C02 and C03 to send the converted form to the appropriate managed object resource controllers C01, C02 and C03.

The management protocol processing section 204 converts the operation requests at the management protocol into adaptive forms to the agent system 3601. The MIS 205 stores the managed objects prepared by abstracting the managed object resources 01, 02 and 03. The managed object resource controllers C01, C02 and C03 provide means to access to the actual managed object resources 01, 02 and 03.

The delegation execution section 202 includes a delegation protocol processing means 211, an access controller 212, a request analyzer 213, a script converter 214, a delegation information storage 215, and a script controller 216.

Information such as messages is communicated between the delegation protocol processing means 211 and manager systems M1, M2 and M3. Although only three manager systems M1, M2 and M3 are shown in FIG. 22, in fact, a plurality of manager systems M1 to Mm are coupled to the delegation protocol processing means 211. The access controller 212 determines whether or not to permit the manager systems M1, M2 and M3 to access to the agent system 201 in response to their request. The request analyzer 213 analyzes the messages sent from the manager systems M1, M2 and M3.

The script converter 214 converts script skeletons into scripts. The script skeletons are written in a text form such as source codes or an immediately executable form such as binary codes or intermediate codes for the agent system 201. The script controller 216 initiates new scripts and controls the running scripts. The delegation information storage 215 stores the scripts, the script information, the access control information and the script skeleton conversion information.

The script information includes the "script identifier" for identifying the scripts uniformly within the agent system 201, the "names of the manager systems" which transmit the script skeletons, the "state" for showing the states of the current scripts with three states 'run', 'suspend' and 'sleep', the contents and purposes of the script skeletons, and the "comment" describing the transmission dates to the agent system 201.

The access control information includes first a list of the names of the manager systems accessible to the agent system 201 (called "manager system name list" hereinafter). On example of the manager system name list is shown in FIG. 30 in which an accessible manager system name field 281 contains manager system names (such as "ManagerA", "ManagerB", "ManagerC", . . . ) accessible to the agent system 201.

The access control information further includes access authority (read possibility only, read-write possibilities and access impossibility) to the intrinsic managed objects with respect to the manager systems M1, M2 and M3 (called "management operation authority list" hereinafter). One example of the management operation authority list is shown in FIG. 31 wherein a manager name field 291 contains the names of the manager systems accessible to the agent system 201, and a specific managed object name field 292 contains names ("moA", "moB", "moC", . . . ) of specific managed objects included in the agent system 201. The management powers of the manager systems such as ManagerA, ManagerB, and ManagerC with respect to the specific managed object name "moA" are the operation powers "read-write", "read-write", and "not-access", respectively, and so forth.

The script skeleton conversion information includes a corresponding list between the abstract and specific managed object names (called "specific managed object corresponding list" hereinafter). One of the specific managed object corresponding list is shown in FIG. 32 wherein a specific managed object name field 302 contains the specific managed object names such as "moA", "moB", "moC", . . . included in the agent system 201, and an abstract managed object name field 301 contains the abstract managed object names such as "netA.ne1", "netA.ne2", "netA.ne3", . . . corresponding to the specific managed object names.

The script skeleton conversion information further includes a corresponding list between abstract and specific managed primitive names (called "specific managed primitive corresponding list" hereinafter). One of the specific managed primitive corresponding list is shown in FIG. 33 in which a specific managed primitive name field 302 contains the specific managed primitive names such as "M-Get", "M-Set", "M-Create", "M-Delete", . . . , actually mounted on the agent system 201, and an abstract managed primitive name field 301 contains the abstract managed primitive names such as "getValue", "setValue", "createMO", "deleteMO", . . . corresponding to the specific managed primitive names.

The delegation information storage 215 further stores a group of specific managed primitives.

FIG. 23 to FIG. 27 are flow charts showing processings of the delegation protocol processing means 211, the access controller 212, the request analyzer 213, the script controller 216, and the script converter 214.

Figure 23:
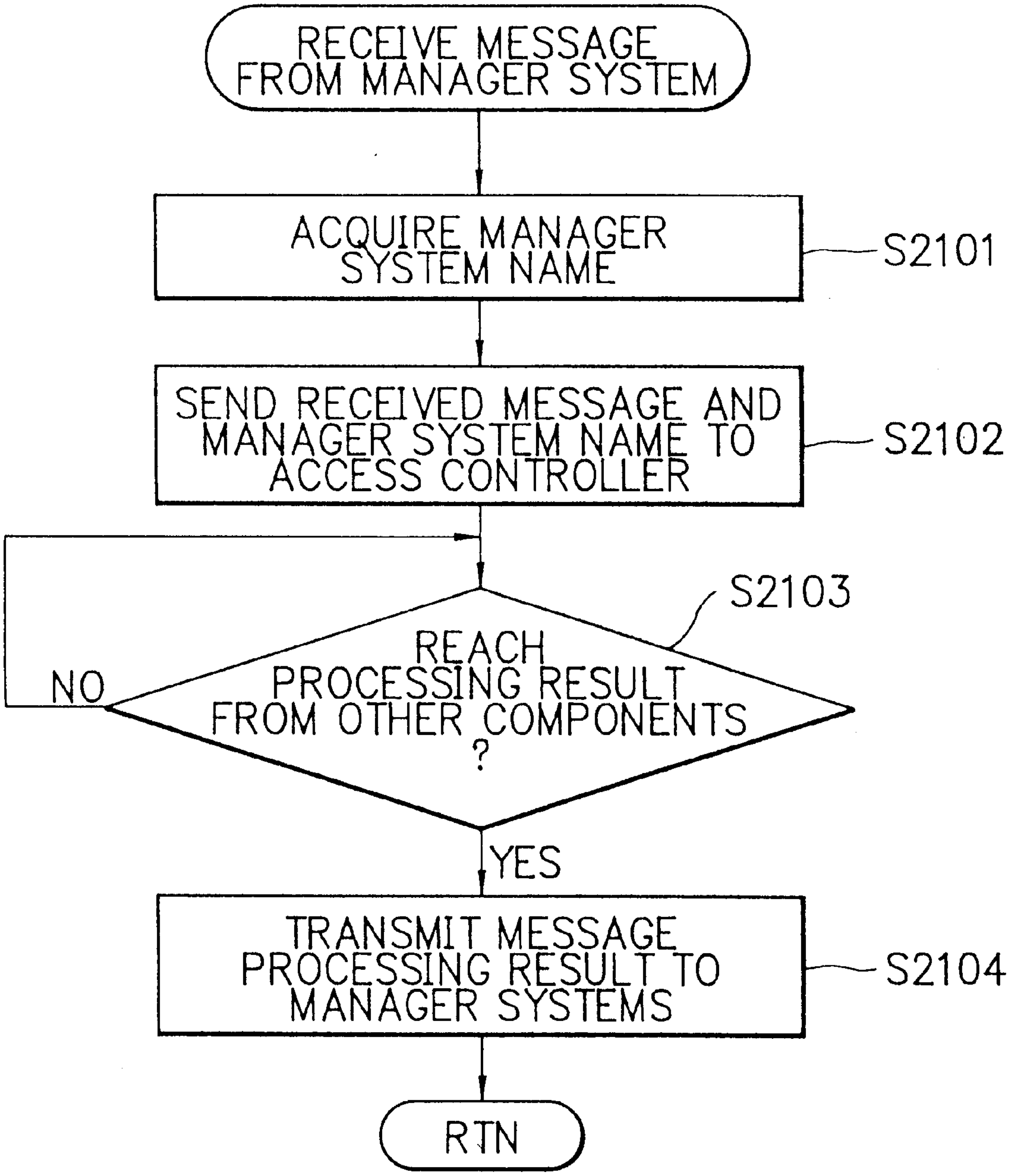
FIG. 23 is a flow chart showing a processing of a delegation protocol processing means shown in FIG. 22.

Referring to FIG. 23, the processing of the delegation protocol processing means 211 includes a manager system name acquisition step S2101, a receive message and manager name name sending step S2102, a process result reach discrimination step S2103, and a message processing result transmission step S2104.

In FIG. 24, the processing of the access controller 212 includes a manager system name and receive message receive step S2201, an access permission discrimination step S2202, a manager system name and receive message sending step S2203, and an access impossibility transmission step S2204.

Figure 25:
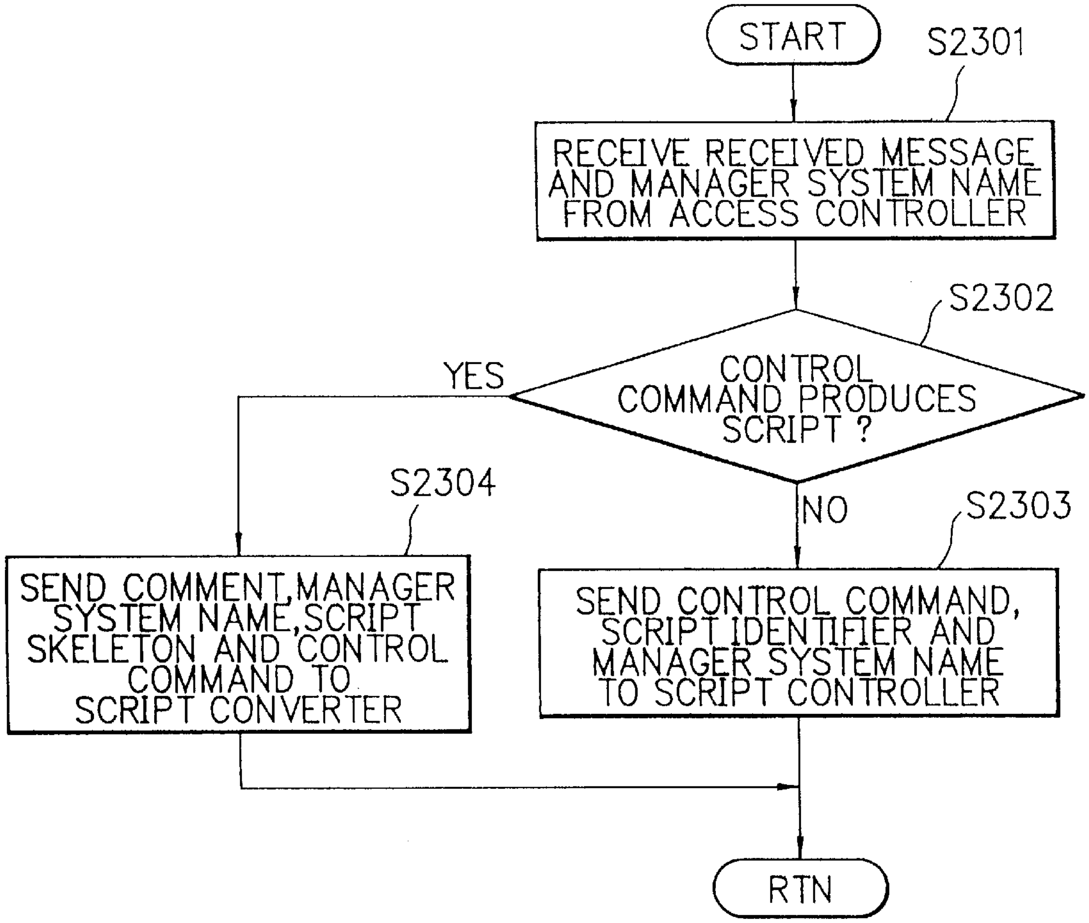
FIG. 25 is a flow chart showing a processing of a request analyzer shown in FIG. 22.

As shown in FIG. 25, the processing of the request analyzer 213 includes a receive message and manager system name receive step S2301, a script formation discrimination step S2302, a control command, script identifier and manager system name sending step S2303, and a comment, manager system name, a script skeleton and control command sending step S2304.

In FIG. 26, the processing of the script controller 216 includes a manager system name, control command and script identifier receive step S2401, a script control possibility discrimination step S2402, a script execution start discrimination step S2403, a script control step S2404, a specific managed primitive dynamic link step S2405, an operation authority deviation discrimination step S2406, a request script execution step S2407, a delegation information storage update step S2408, a control command execution result transmission step S2409, a control impossibility transmission step S2410, and a specific managed object access impossibility transmission step S2411.

Figure 27:
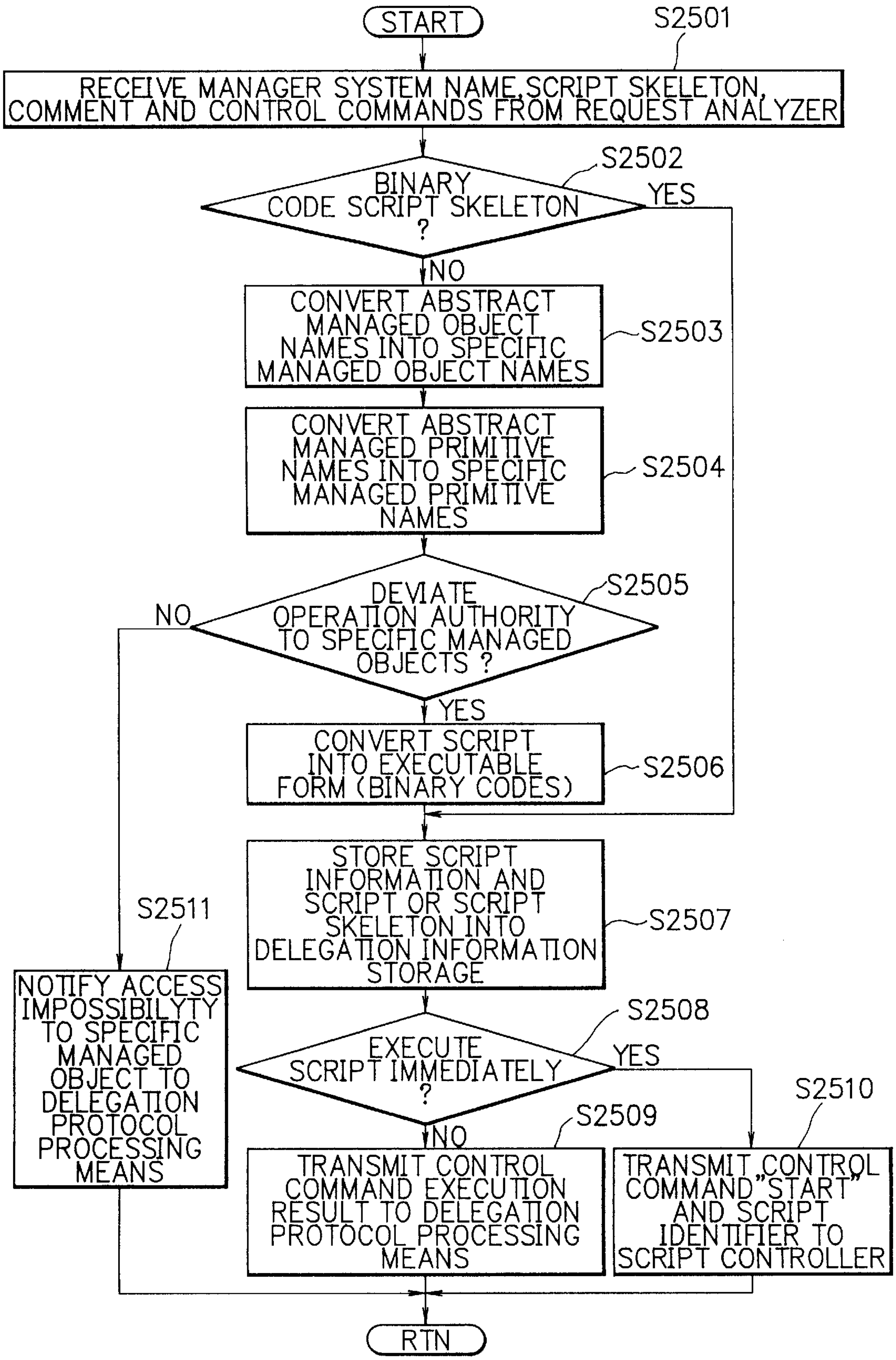
FIG. 27 is a flow chart showing a processing of a script converter shown in FIG. 22.

Referring to FIG. 27, the processing of the script converter 214 includes a manager system name, script skeleton, comment and control command receive step S2501, a script skeleton binary code discrimination step S2502, an abstract-specific managed object name conversion step S2503, an abstract-specific managed primitive name conversion step S2504, an operation authority deviation discrimination step S2505, a script executable code conversion step S2506, a script information and script or script skeleton storage step S2507, a script immediate execution discrimination step S2508, a control command execution result transmission step S2509, a "start" control command and script identifier transmission step S2510, and a specific managed object access impossibility notification step S2511.

Next, the operation of the foregoing agent system 201 according to the seventh embodiment of the present invention will be described in connection with FIG. 22 to FIG. 33.

Now, assuming that the delegation protocol processing means 211 receives a message from, for example, the manager system M1, the delegation protocol processing means 211 starts the processing shown in FIG. 23. First, the delegation protocol processing means 211 acquires the names of the manager systems of which connections with the delegation protocol processing means 211 have been established in step S2101. The delegation protocol processing means 211 transmits the obtained manager system names and the received message to the access controller 212 in step S2102. Thereafter, the delegation protocol processing means 211 awaits the processing results of the other components 212 to 216 in step S2103.

The access controller 212 then starts the processing shown in FIG. 24. First, the access controller 212 receives the manager system names and the received message from the delegation protocol processing means 211 in step S2201. The access controller 212 then retrieves whether or not the received manager system names are present in the manager system name list (see FIG. 30) stored in the delegation information storage 215 in step S2202. As a result in step S2202, when the manager system name is found, the access controller 212 permits the manager system M1 to access to the agent system 201 and transmits the manager system name and the received message to the request analyzer 213 in step S2203.

On the other hand, as a result in step S2202, when no manager system name is found, the access controller 212 rejects the access of the manager system M1 and transmits the access impossibility to the agent system 201 to the delegation protocol processing means 211 in step S2204. When receiving this access impossibility from the access controller 212, the delegation protocol processing means 211 transmits the access impossibility message to the manager system M1 in step S2104.

The request analyzer 213 then starts the processing shown in FIG. 25. First, the request analyzer 213 receives the manager system name and the received message from the access controller 212 in step S2301. The request analyzer 213 then analyzes the received message to judges whether or not the control command represents the script create in step S2302.

Figure 28:
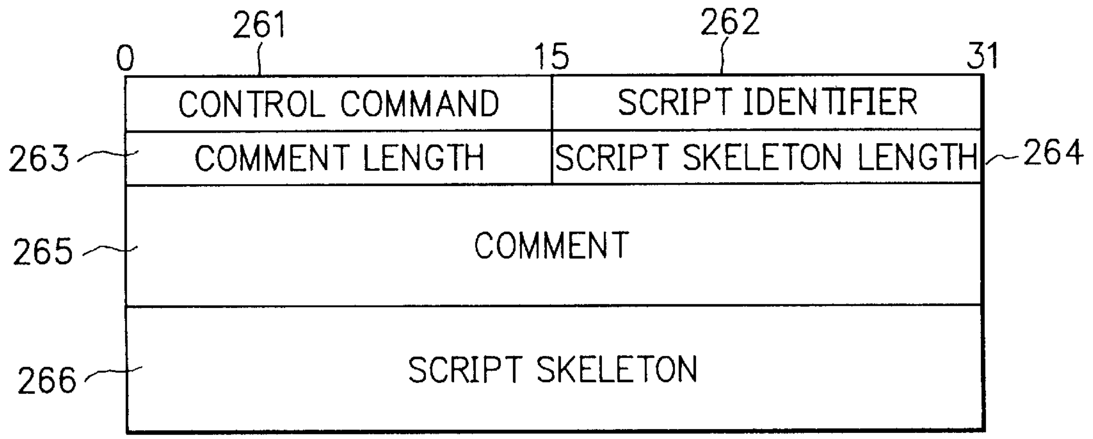
FIG. 28 is a schematic diagram showing a format of a message to be transmitted from a manager system to an agent system shown in FIG. 22.

FIG. 28 illustrates a format of a message sent from the manager systems M1, M2 and M3. In FIG. 28, a control command field 261 contains identifiers of the control commands, that is, one of "1 (create)", "2 (delete)", "3 (start)", "4 (suspend)", "5 (resume)", "6 (info)", and "7 (create&start)". A script identifier field 262 holds a identifier for identifying the script to be an object of the control command execution and the identifier is uniformly assigned to the script converter 214. A comment length field 263 stores a length of a comment that a comment field 265 holds in terms of byte unit, and similarly, a script skeleton length field 264 stores a length of a script skeleton that a script skeleton field 266 holds in terms of byte unit.

In step S2302, the request analyzer 213 cut the fields 261 to 266 into their respective parts and inspects the control command field 261 to analyze the requested control commands. As a result in step S2302, when the control command in the received message is "create" or "ceate&start", the request analyzer 213 sends the separated comment, script skeleton, manager system name and control command to the script converter 214 in step S2304.

On the other hand, as a result in step S2302, when the control command is any one except the "create" and "ceate&start", the request analyzer 213 sends the separated control command, script identifier and manager system name to the script controller 216 in step S2303. Further, the script controller 216 starts the processing shown in FIG. 26. First, the script controller 216 receives the manager system name, the control command and the script identifier from the request analyzer 213 in step S2401. The script controller 216 then examines whether or not the manager system M1 can control the requested script in step S2402. This examination is implemented by acquiring the manager system name in the script information of the requested script identifier from the delegation information storage 215 and by comparing the acquired manager system name with the manager system name sent from the request analyzer 213.

In step 32402, when the manager system name is not coincident, the script controller 216 determines that the manager system M1 has no control power to the script and transmits the control impossibility to the delegation protocol processing means 211 in step S2410. Thereafter, when receiving this control impossibility message from the script controller 216, the delegation protocol processing means 211 transmits the control impossibility message to the manager system M1 in step S2104.

On the other hand, in step S2402, when the manager system name is coincident, the script controller 216 judges that the manager system M1 has the control power to the script and then inspects whether or not the script control command is "start" in step S2403. In step S2403, when the control command is "start", the script controller 216 links the specific managed primitive dynamically in order to execute the script indicated by the script identifier in step S2405.

The script controller 216 then checks whether or not the specific managed primitives to be linked dynamically deviate the operation authority previously given to the manager system M1 in step S2406. This is performed as follows. That is, the management operation authority list (see FIG. 31) stored in the delegation information storage 215 is searched using the manager system name and the specific managed object names as the key to obtain the operation authority, and the obtained operation authority is compared with the operation authority of the requested specific managed primitives.

As a result in step S2406, when none of the specific managed primitives deviate the operation authority, the script controller 216 executes the requested script in step S2407. As a result in step S2406, when the specific managed primitives deviate the operation authority, the script controller 216 transmits the access impossibility to the specific managed objects to the delegation protocol processing means 211 in step S2411. Thereafter, when receiving the access impossibility message from the script controller 216, the delegation protocol processing means 211 transmits the access impossibility message to the specific managed objects to the manager system M1 in step S2104.

Further, as a result in step S2403, when the control command is any one except "start", the script controller 216 executes the control command to the script shown by the script identifier in step S2404. The script controller 216 then updates the corresponding information stored in the delegation information storage 215 according to the script information change due to the command execution in step S2408. In turn, the script controller 216 transmits the result (success or failure) of the control command execution to the delegation protocol processing means 211 in step S2409. When receiving this control command execution result from the script controller 216, the delegation protocol processing means 211 transmits the control command execution result to the manager system M1 in step S2104.

Further, as a result in step S2302 in the request analyzer 213, when the control command is any one except "create" and "create&start", the script converter 214 implements the processing shown in FIG. 27. First, the script converter 214 receives the manager system name, the script skeleton, the comment and the control command from the request analyzer 213 in step S2501. The script converter 214 then checks whether the description form of the script skeleton is the changeable text form or the binary codes in step S2502. As a result in step S2502, when the script skeleton is written in the text form, the script converter 214 converts the abstract managed object names into the specific managed object names in step S2503. This conversion is carried out by searching the specific managed object corresponding list (see FIG. 32) stored in the delegation information storage 215 using the abstract managed object names as the key to retrieve the corresponding specific managed object names.

The script converter 214 then converts the abstract managed primitive names into the specific managed primitive names using the specific managed primitive corresponding list (see FIG. 33) stored in the delegation information storage 215 in step S2504 in the same manner as that in step S2503. Thereafter, the script converter 214 searches the management operation authority list (see FIG. 31) stored in the delegation information storage 215 using the specific managed object names and the manager system name as the key to check the operation authority of all the converted specific managed objects to acquire the operation authority of the manager system M1 and to examine whether or not the requested specific managed primitives deviate the operation authority in step S2505.

As a result in step S2505, when at least one of the specific managed objects deviates the operation authority, the script converter 214 determines the access impossibility to the specific managed objects and transmits this access impossibility to the delegation protocol processing means 211 in step S2511. Thereafter, receiving this access impossibility message from the script converter 214, the delegation protocol processing means 211 transmits the access impossibility message to the specific managed objects to the manager system M1 in step S2104.

On the other hand, as a result in step S2505, when none of the specific managed objects deviate the operation authority, the script converter 214 converts the scripts produced in steps S2503 and S2504 into the executable form such as the binary codes for the agent system 201 by, for example, compiling in step S2506. The script converter 214 sends the script skeleton of the binary codes obtained in step S2502 or the scripts of the binary codes and the script information resulted in step S2506 to the delegation information storage 215 for storing the same in step S2507. The script information to be stored includes the manager system name, the comment, the uniform script identifiers that the script converter 214 assigns within the agent system 201, and the state "sleep".

The script converter 214 then checks whether or not the control command is "create&start" in step S2508. As a result in step S2508, when the control command is "create&start", in order to immediately execute the script stored in the delegation information storage 215 in step 2507, the script converter 214 transmits the control command "start" and the script identifier assigned in step S2507 to the script controller 216 in step S2510.

As a result in step S2508, when the control command is "create", the script converter 214 transmits the execution result (success or failure) to the delegation protocol processing means 211 in step S2509. When receiving the execution result from the script converter 214, delegation protocol processing means 211 transmits the execution result to the manager system M1 in step S2104.

Figure 29:
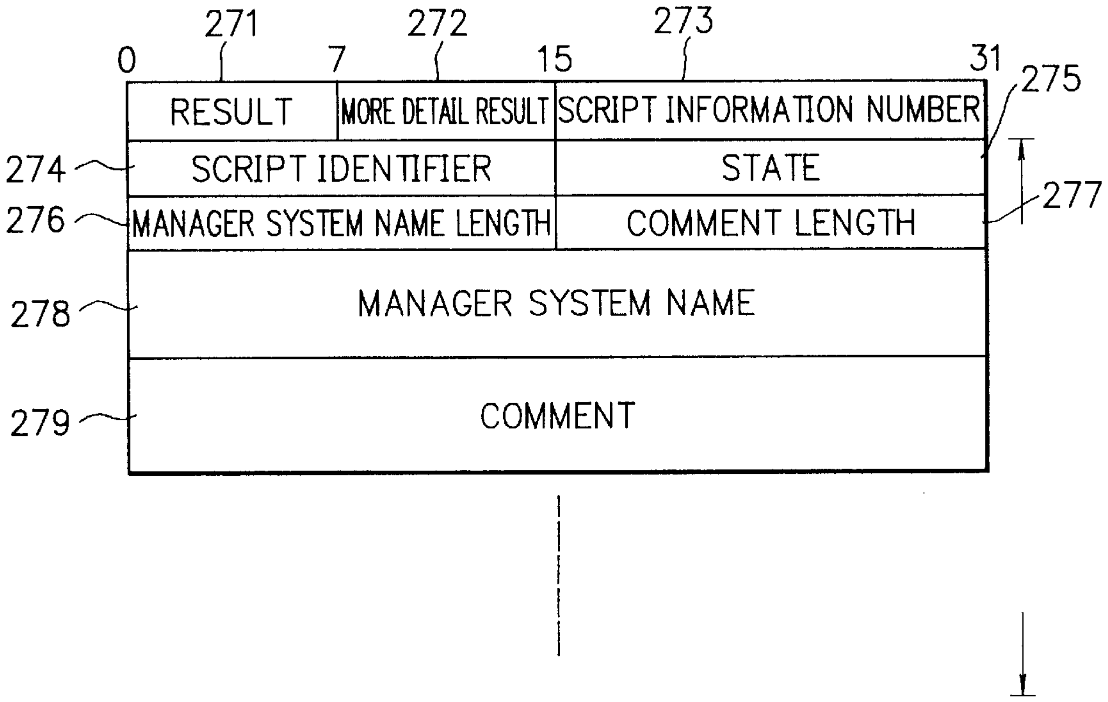
FIG. 29 is a schematic diagram showing a format of a message to be transmitted from an agent system to manager systems shown in FIG. 22.

FIG. 29 shows a format of a message holding a control command execution result to be transmitted from the agent system 201 to the manager systems M1, M2 and M3. In FIG. 29, a result field 271 contains the results, that is, either "0 (success)" or "1 (failure)" of the control commands requested by the manager systems M1, M2 and M3. When the result field 271 contains "1 (failure)"; a more detail result field 272 contains more detail information, that is, one of "1 (access impossibility to agent system 201)", "2 (control impossibility to script)", "3 (access impossibility to specific managed object)", and "4 (the other failures)". When the result field 271 contains "0 (success)", the more detail result field 272 contains "0". A script information number field 273 holds a number of script information 274 to 279 following this field 273. A script identifier field 274 contains the identifier of the script holding this information. A state field 275 holds the state of the existence of the script, that is, one of "1 (run)", "2 (suspend)" and "3 (sleep)". A manager system name length field 276 contains a manager system name length that a manager system name field 278 holds in terms of byte unit. A comment length field 277 contains a comment length that a comment filed 279 holds in terms of byte unit. These fields 274 to 279 represent the information of one script and continue as many as the number the script information number field 273 holds.

Figure 34:
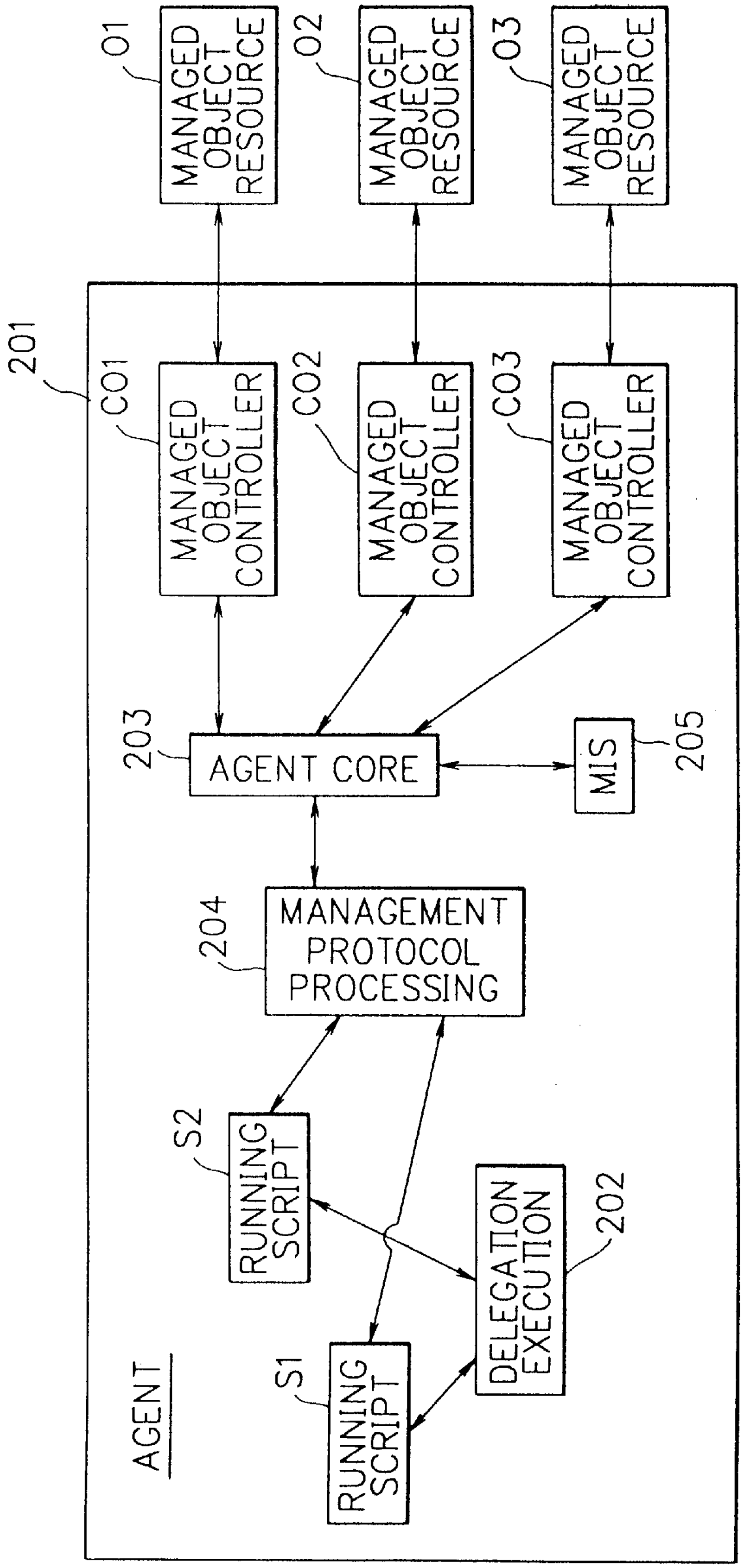
FIG. 34 is a block diagram of an agent system having a delegation device according to an eighth embodiment of the present invention, to which a remote execution system having a program receiver of the present invention is applied in a network management.

An agent system according to an eighth embodiment of the present invention, as shown in FIG. 34, will be described.

In this embodiment, as shown in FIG. 34, the agent system 201 has the same construction as that of the seventh embodiment shown in FIG. 22, except that information is communicated between running scripts S1 and S2 and a management protocol processing section 204. In FIG. 34, although two running scripts S1 and S2, three managed object resource controllers C01, C02 and C03 and three managed object resources 01, 02 and 03 are shown, in fact, a plurality of running scripts S1 to Sk, a plurality of managed object resource controllers C01 to C0m and a plurality of managed object resources 01 to 0m are used.

In the above-described agent system of the seventh embodiment of the present invention, the communication between the running script S1 and the agent core 203 is carried out directly using, for example, its own system such as a library. In this embodiment, as shown in FIG. 34, the communication between the running scripts S1 and S2 and the agent core 203 is implemented via the management protocol processing section 204. That is, using a standard management protocol such as simple network management protocol or common management information protocol, first, the communication is executed between the running scripts S1 and S2 and the management protocol processing section 204. The management protocol processing section 204 converts the management operation request exhibited by the standard management protocol into its internal expression and thereafter communicates with the agent core 203, resulting in indirectly implementing the communication between the running scripts S1 and S2 and the agent core 203.

Figure 35:
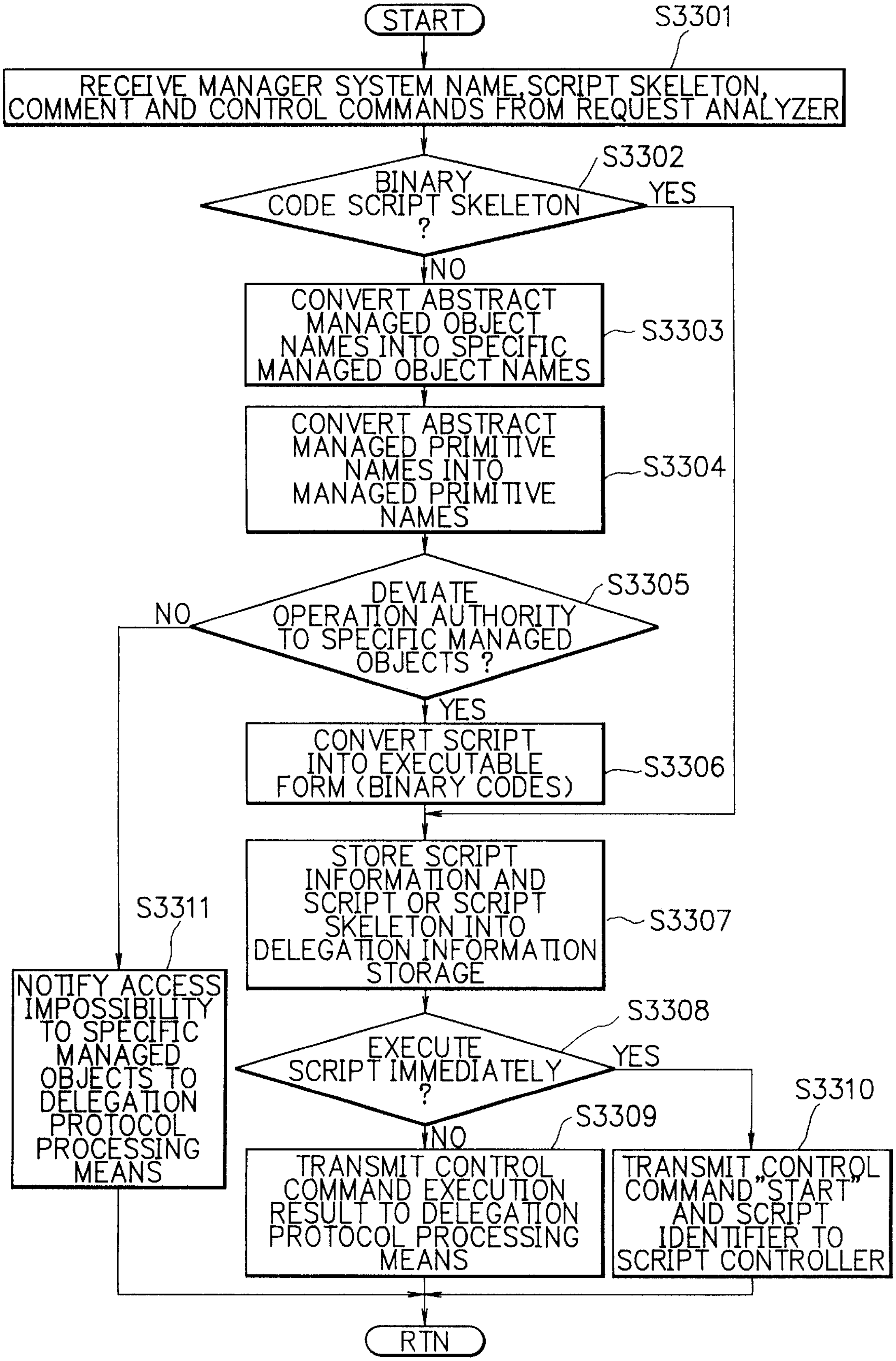
FIG. 35 is a flow chart showing a processing of a script converter of a delegation execution section shown in FIG. 34.

FIG. 35 shows the processing of a script converter 214 of a delegation execution section 202 shown in FIG. 34, including a manager system name, script skeleton, comment and control command receive step S3301, a script skeleton binary code discrimination step 3302, an abstract-specific managed object names conversion step S3303, an abstract-specific managed primitive names conversion step S3304, an operation authority deviation discrimination step S3305, a script executable form conversion step S3306, a script information and script and script skeleton storage step S3307, a script immediate execution discrimination step S3308, a control command execution result transmission step S3309, a control command "start" and script identifier transmission step S3310, and a specific managed object access impossibility notification step S3311.

Next, the operation of the foregoing agent system 201 according to the eighth embodiment of the present invention will be described in connection with FIG. 34 to FIG. 36.

In this embodiment, the difference of the eighth embodiment of the agent system from the seventh embodiment described above is that the processing of the script converter 214, shown in FIG. 27, is changed to the processing shown in FIG. 35. In particular, step 3304 shown in FIG. 35 is changed from the corresponding step S2304 shown in FIG. 27. That is, abstract managed primitive names are converted into managed primitive names (managed primitives represent various services supplied by the management protocol) using a corresponding list between the abstract managed primitive names and the managed primitive names (called "managed primitive corresponding list hereinafter) stored in the delegation information storage 215 in the delegation execution section 202. When MSAP (management service access point) provided by OSIMIS (open systems interconnection management information service) is used, one example of the managed primitive corresponding list is shown in FIG. 36 in which an abstract managed primitive name field 341 contains the abstract managed primitive names such as "getValue", "setValue", "createMO", "deleteMO", . . . and a managed primitive name field 342 contains the managed primitive names such as "M-Get", "M-Set", "M-Create", "M-Delete", . . . corresponding to the above abstract managed primitive names.

In this embodiment, the standard protocol is used for the communication between the running scripts S1 and S2 and the agent core 203 via the management protocol processing means 204 in the delegation execution section 202 of the agent system 201, and hence the flexibility can be improved in the delegation execution section 202 as a delegation device.

Further, in the agent system of the seventh embodiment, it is assumed that the managed object resources 01, 02 and 03 to be managed actually are located near the agent system. However, in the agent system of the eighth embodiment, the communication between the running scripts S1 and S2 and the agent core 203 is indirectly carried out via the management protocol processing means 204 using the standard management protocol, and, even when the managed object resources 01, 02 and 03 are located at remote places, the delegation device can be used. As a result, the flexibility of the delegation execution section 202 can be improved, and the agent system can manage the managed object resources 01, 02 and 03 positioned in various places.

As described above, according to the present invention, a server system is provided with a program receiver, a dynamic binding section, a program execution section and a program execution information storage, and processings that a user wants to execute are programmed and sent to the server system to execute the programs thereon. Hence, complicated processings having control structures such as branches and repeats can be executable on server systems at remote places.

A program to be sent from a client system to a server system describes a flow of a processing only, and the server system includes a specific operation object linker so as to link specific operation objects of each server system for performing various processings at a program execution time to the program dynamically. As a result, it is sufficient for a user to describe only the flow of the processing without considering the construction and the mountings of the server system, and the program description efficiency can be improved.

The server system further includes a link authority inspector so as to control the linking using a link authority of a client system when linking the specific objects to the program, resulting in preventing the program execution beyond the link authority of the client system. As a result, security of the server system can be improved.

The program describing only the flow of the processing independent of the construction and the mountings of the server system is transmitted to the server system to execute the program, and the communication amount between the server system and the client system can be reduced.

When a server system having a program receiver ("server system") is applied to an agent system having a delegation device ("agent system") in a network management, the agent system is further provided with an agent core which controls an MIS, provides an operation to the MIS and a common management operation to various managed object resources, converts requested management operations into adaptive forms to managed object resource controllers, and delivers the converted forms to appropriate managed object resource controllers, resulting in enabling the network management in consideration of the OSI network management. In addition, a script skeleton can be described using the common management operating means for the managed object resources, resulting in improving the description efficiency of the script skeleton.

The dynamic binding section is used within the agent system, and the script skeleton sent from a manager system describes only the flow of the management task. Hence, at the transmitting of the script skeleton time, the communication amount between the manager system and the agent system can be reduced compared with that of a conventional agent system.

By adding control commands of a running script and script information, accurate script control that no conventional agent system has been can be performed, and the agent system can flexibly meet the script execution and the management policies of the management sites depending on the load condition of the agent system.

With the addition of an access controller, the agent system can conduct a flexible access control depending on manager names and the management policies of the management cites, resulting in improving security of the agent system.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A remote execution system having a program receiver and acting as a server system, comprising:

a program receiver, a program execution information storage, a dynamic binding section, and a program execution section;

said program receiver:

receiving, from a client system, a program describing a flow of processing, and transmitting an execution result of said program;

said program execution information storage storing:

said program access control information, and specific operation objects;

said dynamic binding section including a link authority inspector and a specific operation object linker, wherein:

said link authority inspector, based on said access control information, determines whether said client system has authority to link said program with ones of said specific operation objects indicated by processing operation names in said program, and said specific operation object linker dynamically links said ones of said specific operation objects to processing operation names, when said link authority inspector determines said client system has said authority, to provide a corresponding linked program; and said program execution section executing said corresponding linked program.

2. The remote execution system as set forth in claim 1, wherein said dynamic binding system protects said server system by determining whether said client system has said authority.

3. The remote execution system as set forth in claim 1, wherein said program receiver further comprises an access controller determining whether said client system is permitted access to said server system.

4. The remote execution system as set forth in claim 3, wherein said access controller;

prevents unauthorized execution of programs changing said access control information; and determines whether said specific operation objects indicated by said processing operation names in said program will, during execution of said corresponding linked program, deviate said access control information of said client system.

5. The remote execution system as set forth in claim 1, wherein said program receiver comprises a program converter;

converting abstract operation object names, as processing operation names common to a plurality of server systems, into corresponding ones of said specific operation object names, and converting received programs, of a changeable text form, into programs executable by said server system.

6. The remote execution system as set forth in claim 5, wherein said program converter:

converts received programs written in written in intermediate codes into said programs executable by said server system, and stores received programs written in binary codes into said program execution information storage.

7. The remote execution system as set forth in claim 1, wherein said program receiver comprises an access controller and a program converter, wherein:

said access controller determines whether said client system is accessible to said server system;

said program converter converts abstract operation object names, as processing operation names common to a plurality of server systems, into corresponding ones of said specific operation object names; and said program converter converts received programs, of a changeable text form, into programs executable by said server system.

8. The remote execution system as set forth in claim 7, wherein said program converter:

converts received programs written in written in intermediate codes into said programs executable by said server system, and stores received programs written in binary codes into said program execution information storage.

9. An agent system, comprising:

a delegation execution section, an agent core, a management information storage, and managed object resource controllers;

said delegation execution section comprising:

a delegation protocol processing section receiving a message from a manager system;

a delegation information storage storing scripts, management operations, access control information, script conversion information, and said received message;

an access controller determining, based on said access control information, whether said manager system has authority for said received message;

a request analyzer analyzing said received message to determine whether said received message indicates creation of a new script;

a script converter converting a script skeleton of said received message into an executable script of a series of said management operations, wherein said script skeleton describes a flow of said management operations using abstract expressions different from names of said management operations, and wherein said script converter converts said abstract expressions using said script conversion information, said executable script being stored in said delegation information storage; and a script controller controlling said creation of said new script to execute said executable script, and controlling operations of a running script; said managed object resource controllers controlling managed object resources;

said management information storage storing management objects obtained by abstracting said managed object resources; and said agent core;

managing said management information storage, indicating common management operations for said managed object resources, converting requested ones of said management operations into converted management operations having a form adapted for corresponding ones of said managed object resource controllers, and delivering said converted management operations to said corresponding ones of said managed object resource controllers.

10. The agent system as set forth in claim 9, wherein:

said access controller system protects said managed object resources by determining, when said received message is received, whether said manager system has authority to access said agent system;

said script controller determines whether said manager system has authority to control said running script;

said script controller determines whether said manager system has authority to use said management operations indicated by said received message based on said access control information; and said script converter determines whether said manager system has authority to perform said management operations in said corresponding executable script with respect to said managed object resource controllers.

11. The agent system as set forth in claim 9, wherein said management operations include a suspend operation, a stop operation, a resume operation, a start operation, and an information acquisition operation.

12. The agent system as set forth in claim 9, further comprising a script information structure uniform with respect to start date, state, script identifier, manager system name, and comment.

13. The agent system as set forth in claim 9, wherein, when a running script accesses said management information storage and said managed object resources, said running script indirectly accesses to said agent core by communicating with a management protocol processing section for converting an operation request in a management protocol form into a form adapted for use by said agent core.

* * * * *